(12) United States Patent
Ota et al.

(10) Patent No.: US 12,328,261 B2
(45) Date of Patent: Jun. 10, 2025

(54) TRANSMISSION APPARATUS, COMMUNICATIONS SYSTEM, AND INFORMATION TRANSMISSION METHOD WITH PAM-4 MODULATION

(71) Applicant: Sony Semiconductor Solutions Corporation, Kanagawa (JP)

(72) Inventors: Satoshi Ota, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/411,425

(22) Filed: Jan. 12, 2024

(65) Prior Publication Data

US 2024/0146654 A1 May 2, 2024

Related U.S. Application Data

(63) Continuation of application No. 17/225,506, filed on Apr. 8, 2021, now Pat. No. 11,902,162.

(60) Provisional application No. 63/049,923, filed on Jul. 9, 2020.

(51) Int. Cl.
| | |
|---|---|
| *H04L 47/10* | (2022.01) |
| *H04L 45/74* | (2022.01) |
| *H04L 47/12* | (2022.01) |
| *H04L 47/26* | (2022.01) |
| *H04N 7/04* | (2006.01) |
| *H04N 23/66* | (2023.01) |

(52) U.S. Cl.
CPC .............. *H04L 47/16* (2013.01); *H04L 45/74* (2013.01); *H04L 47/12* (2013.01); *H04N 7/04* (2013.01); *H04N 23/66* (2023.01)

(58) Field of Classification Search
CPC ....... H04L 47/12; H04L 45/74; H04L 47/266; H04L 47/16; H04N 7/04; H04N 23/66
See application file for complete search history.

(56) References Cited

U.S. PATENT DOCUMENTS

| | | | |
|---|---|---|---|
| 2016/0308641 A1* | 10/2016 | Zeng | ..................... H04J 3/1694 |
| 2018/0070111 A1 | 3/2018 | Kwon et al. | |
| 2021/0037409 A1 | 2/2021 | Thorsen et al. | |

(Continued)

FOREIGN PATENT DOCUMENTS

| | | |
|---|---|---|
| JP | 2000124929 A | 4/2000 |
| JP | 2007528681 A | 10/2007 |

OTHER PUBLICATIONS

International Search Report dated Jul. 20, 2021 for corresponding International Application No. PCT/2021/021296.

*Primary Examiner* — Harry H Kim
(74) *Attorney, Agent, or Firm* — Michael Best & Friedrich LLP

(57) ABSTRACT

There is provided a transmission apparatus that transmits information generated by an information source and divided for each block to a transmission path in units of frames including a plurality of the blocks, including: a transmission unit that stops the transmission of information to the transmission path or transmits toggle data to the transmission path in one of several blocks in the frame where an amount of information to be transmitted is less than a transmission capacity of the transmission path, the toggle data having a cycle of transition of information longer than that of information in a block other than the one block in the frame.

10 Claims, 34 Drawing Sheets

(56) References Cited

U.S. PATENT DOCUMENTS

| | | |
|---|---|---|
| 2021/0313937 A1* | 10/2021 | Kim .................... H04L 25/0272 |
| 2021/0377080 A1* | 12/2021 | Park ........................ H04L 25/14 |
| 2022/0014469 A1 | 1/2022 | Ota et al. |
| 2023/0090712 A1 | 3/2023 | Thorsen et al. |

* cited by examiner

| NRZ | |
|---|---|
| Mapper input | Output level |
| 1 | A |
| 0 | 0 |

FIG.7A

PAM4

| Mapper input | Output level |
|---|---|
| 1,0 | B |
| 1,1 | 2*B/3 |
| 0,1 | B/3 |
| 0,0 | 0 |

TRANSMISSION APPARATUS, COMMUNICATIONS SYSTEM, AND INFORMATION TRANSMISSION METHOD WITH PAM-4 MODULATION

CROSS REFERENCE TO RELATED APPLICATIONS

This application is a Continuation Application of patent application Ser. No. 17/225,506, filed Apr. 8, 2021, which claims the benefit of U.S. Priority Patent Application U.S. 63/049,923 filed Jul. 9, 2020, the entire contents of which are incorporated herein by reference.

BACKGROUND

The present disclosure relates to a transmission apparatus, a communications system, and an information transmission method.

BACKGROUND ART

Recently, in the automotive field, various sensors for external environmental recognition are used for a driving support system and an automated driving technology. As one of these sensors, it is common to use a camera incorporating an image sensor. The signals picked up by the camera are transmitted to an ECU that performs recognition processing through a transmission path of a system of a high-speed serial interface. Information of various sensors other than the camera is transmitted through the transmission path. The majority of information transmitted through the transmission path is often imaging signals from the camera because the amount of information of the imaging signals from the camera is generally overwhelmingly larger than the amount of information of other sensors.

SUMMARY

The transmission path has a fixed transmission capacity for information that can be transmitted, and cannot transmit information that exceeds the transmission capacity. In the case where information having the amount less than the transmission capacity is transmitted through transmission path, it is desirable to match the amount of information from an information source, which is to be transmitted through the transmission path, with the transmission capacity of the transmission path because the transmission capacity of the transmission path cannot be effectively utilized. However, since it is actually difficult to match the amount of information with the transmission capacity, the transmission capacity of the transmission path is usually made greater than the amount of information from the information source, and invalid data (referred to also as null data) having the amount corresponding to a margin in the transmission capacity is transmitted to the transmission path. Since invalid data consumes transmission energy although a reception apparatus does not originally need the data, it is desirable not to transmit invalid data to the transmission path as much as possible. In particular, since a transmission apparatus that transmits imaging signals of an in-vehicle camera is often disposed on the vehicle body surface away from a power source, it is difficult to supply power with a margin, as well as the temperature conditions of the operating environment is also severe. Therefore, the in-vehicle camera is desired to suppress power consumption as much as possible.

In view of the above, it is desired to provides a transmission apparatus, a communications system, and an information transmission method that are capable of reducing power consumption at the time of transmission of information.

According to an embodiment of the present disclosure, a transmission apparatus that transmits information generated by an information source and divided for each block to a transmission path in units of frames including a plurality of the blocks, including: a transmission unit that stops the transmission of information to the transmission path or transmits toggle data to the transmission path in one of several blocks in the frame, where an amount of information to be transmitted is less than a transmission capacity of the transmission path, the toggle data having a cycle of transition of information longer than that of information in a block other than the one block in the frame.

The transmission unit may transmit data of a specific signal logical value to the transmission path or set the transmission path to a high impedance during a period in which the transmission of information to the transmission path is stopped.

The transmission unit may set a destination address of the one block in which the transmission of information to the transmission path is stopped to an address that is different from an address of a reception apparatus that receives information via the transmission path.

The transmission unit may include a scrambler that generates scrambled data obtained by scrambling information generated by the information source, regardless of whether or not the transmission of information to the transmission path is stopped.

The transmission unit may transmit a predetermined resynchronization pattern to the transmission path after a period in which the transmission of information to the transmission path is stopped has elapsed and before the transmission of information to the transmission path is resumed, and the resynchronization pattern may be used for performing synchronous reproduction processing of information received by a reception apparatus via the transmission path.

The transmission unit may include a selection unit that selects one of the scrambled data and a predetermined resynchronization pattern used for performing synchronous reproduction processing of information received by a reception apparatus via the transmission path and transmits the selected one to the transmission path.

The transmission unit may include a scheduler that controls the selection by the selection unit on the basis of a control signal transmitted by the reception apparatus via the transmission path.

The transmission unit may include a scrambler that generates scrambled data obtained by scrambling information generated by the information source, the scrambler may include a shift register including a plurality of registers that sequentially shifts serial data corresponding to information generated by the information source, and a logical arithmetic unit that generates the scrambled data by a predetermined logical operation between the data shifted by the shift register and the serial data to be input to the shift register, and the transmission unit may cause information to be transmitted to the transmission path to transit at a cycle corresponding to the number of stages of the plurality of registers in the shift register in one of several blocks in the frame.

The transmission unit may transmit, to the transmission path, information including consecutive is having the number of bits corresponding to the number of the plurality of registers in the shift register and consecutive 0s having the number of bits corresponding to the number obtained by subtracting 1 from the number of the plurality of registers in the shift register in one of several blocks in the frame.

The transmission unit may transmit, to the transmission path, information including consecutive is having the number of bits corresponding to the number selected, by a predetermined method, from the number of the plurality of registers in the shift register and the number obtained by subtracting 1 from the number of the plurality of registers, and consecutive 0s having the number of bits corresponding to the number selected, by a predetermined method, from the number obtained by subtracting 1 from the number of the plurality of registers in the shift register and the number obtained by subtracting 2 from the number of the plurality of registers in one of several blocks in the frame.

The transmission unit may transmit, to the transmission path, header information whose destination address is an address different from an address of a reception apparatus connected to the transmission path before transmitting information to the transmission path in one of several blocks in the frame.

The header information may include identification information of the toggle data.

The transmission unit may include a pseudo-random number device that generates a pseudo-random number signal, and a scrambler that generates the toggle data on the basis of the pseudo-random number signal in one of several blocks in the frame.

The transmission apparatus may further include:
a replacement unit that selects information generated by the information source in a block other than the one block in the frame and selects the pseudo-random number signal in the one block; an error correction processor that adds an error correction code to information selected by the replacement unit; and a delayer that delays the pseudo-random number signal by a predetermined period, in which the scrambler may generate the toggle data on the basis of an output signal of the error correction processor and an output signal of the delayer in one of several blocks in the frame.

The predetermined period may be a period from when the pseudo-random number device generates the pseudo-random number signal to when an output signal of the error correction processor is input to the scrambler, and the scrambler may generate the toggle data by one of an exclusive-OR of an output signal of the error correction processor and an output signal of the delayer and an exclusive-OR of the output signal of the error correction processor and an inverted signal of the output signal of the delayer in one of several blocks in the frame.

The pseudo-random number device may include a shift register including a plurality of registers, and the scrambler may generate the toggle data including consecutive first signal logical numbers having the number of bits corresponding to the number of the plurality of registers in the shift register, and second signal logical numbers having the number of bits corresponding to the number obtained by subtracting 1 from the number of the plurality of registers in the shift register in one of several blocks in the frame.

The pseudo-random number device may include a shift register including a plurality of registers, and the scrambler may generate the toggle data including consecutive first signal logical numbers having the number of bits corresponding to the number selected, by a predetermined method, from the number of the plurality of registers in the shift register and the number obtained by subtracting 1 from the number of the plurality of registers, and consecutive second signal logical numbers having the number of bits corresponding to the number selected, by a predetermined method, from the number obtained by subtracting 1 from the number of the plurality of registers in the shift register and the number obtained by subtracting 2 from the number of the plurality of registers in one of several blocks in the frame.

The scrambler may maximize a cycle in one of several blocks in the frame or may generate the toggle data having a cycle that can be arbitrarily selected.

The transmission unit may transmit information to the transmission path within a period allocated by a TDD (Time Division Duplex) method.

According to another embodiment of the present disclosure, there is provided a communications system including: a master apparatus; and a slave apparatus that transmits information generated by an information source and divided for each block to the master apparatus via a transmission path in units of frames including a plurality of the blocks in accordance with an instruction from the master apparatus, the slave apparatus including a transmission unit that stops the transmission of information to the transmission path or transmits toggle data to the transmission path in one of several blocks in the frame where an amount of information generated by the information source is less than a transmission capacity of the transmission path, the toggle data having a cycle of transition of information longer than that of information in a block other than the one block in the frame.

According to another embodiment of the present disclosure, there is provided an information transmission method of transmitting information generated by an information source and divided for each block to a transmission path in units of frames including a plurality of the blocks, including: stopping the transmission of information to the transmission path or transmitting toggle data to the transmission path in one of several blocks in the frame, where an amount of information generated by the information source is less than a transmission capacity of the transmission path, the toggle data having a cycle of transition of information longer than that of information in a block other than the one block in the frame.

BRIEF DESCRIPTION OF DRAWINGS

FIG. 7A is a diagram showing an example of the output level in the case where the modulation method is NRZ;

FIG. 7B is a diagram showing an example of the output level in the case where the modulation method is PAM4;

FIG. 11B is a diagram showing scrambled data according to the first improvement example;

DETAILED DESCRIPTION OF EMBODIMENTS

Hereinafter, a transmission apparatus, a communications system, and an information transmission method according to an embodiment of the present disclosure will be described. The main components of a transmission apparatus, a communications system, and an information transmission method will be mainly described below, but there may be components and functions in the transmission apparatus, the communications system, and the information transmission method that are not illustrated or described. The following description does not exclude components or functions that are not illustrated or described.

(Schematic Configuration of Communications System)

Figure 1:
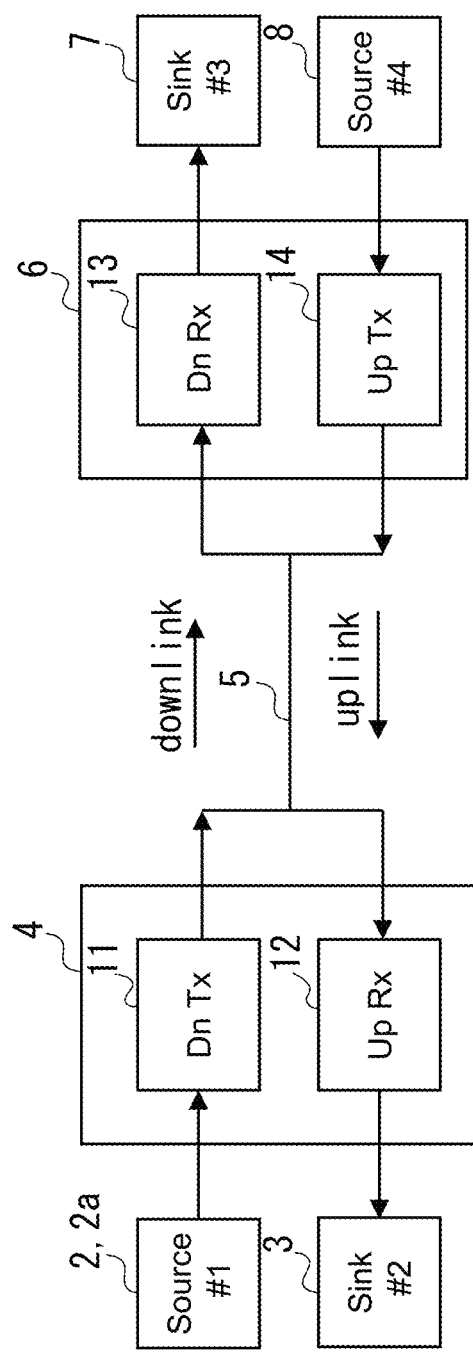
FIG. 1 is a block diagram showing a schematic configuration of a communications system according to an embodiment of the present disclosure.

FIG. 1 is a block diagram showing a schematic configuration of a communications system 1 according to an embodiment of the present disclosure. The communications system 1 in FIG. 1 includes a first information source (Source #1) 2, a first sink device (Sink #2) 3, a first SerDes unit (SerDes1) 4, a transmission path (cable) 5, a second SerDes unit (SerDes2) 6, a second sink device (Sink #3) 7, and a second information source (Source #4) 8. Each of the first SerDes unit 4 and the second SerDes unit 6 functions as a transmission apparatus and a reception apparatus. More specifically, in the case where the first SerDes unit 4 functions as a transmission apparatus, the second SerDes unit 6 functions as a reception apparatus. Further, in the case where the second SerDes unit 6 functions as a transmission apparatus, the first SerDes unit 4 functions as a reception apparatus. Hereinafter, the configuration and operation in the case where the first SerDes unit 4 functions as a transmission apparatus and the second SerDes unit 6 functions as a reception apparatus will be mainly described. The second sink device 7 and the second information source 8 may be incorporated in, for example, a host apparatus.

The first SerDes unit 4 and the second SerDes unit 6 are connected to each other by one cable (transmission path) 5 and transmit signals bidirectionally through this cable 5. More specifically, the first SerDes unit 4 and the second SerDes unit 6 transmit signals bidirectionally by, for example, a TDD (Time Division Duplexing) method. In FIG. 1, the signaling path on the transmission path 5 through which information is serially transmitted from the first SerDes unit 4 to the second SerDes unit 6 is referred to as the downlink or forward channel, and the signaling path on the transmission path 5 through which information is serially transmitted from the second SerDes unit 6 to the first SerDes unit 4 is referred to as the uplink or reverse channel. Further, in this embodiment, assumption is made that the downlink has an amount information larger than that of the uplink.

The first SerDes unit 4 includes a downlink transmission unit (Dn Tx) 11 and an uplink reception unit (Up Rx) 12. The second SerDes unit 6 includes a downlink reception unit (Dn Rx) 13 and an uplink transmission unit (Up Tx) 14.

The first information source 2 includes, for example, one or more sensors. Each of the one or more sensors outputs sensing information. The one or more sensors may include an image sensor. The image sensor outputs a captured imaging signal. The imaging signal may be a dynamic image signal or a stationary image signal. Hereinafter, various types of sensing information output from the first information source 2 will be collectively referred to as "information".

Information output from the first information source 2 is input to the downlink transmission unit 11 in the first SerDes unit 4. The downlink transmission unit 11 performs packet-processing on information from the first information source 2 to convert the information into serial data, and transmits the obtained serial data to the transmission path 5. Another information source may be present in addition to the first information source 2. Information output from each of the information sources is transmitted to the downlink transmission unit 11 in the first SerDes unit 4.

The uplink reception unit 12 in the first SerDes unit 4 receives the serial data transmitted by the uplink on the transmission path 5 and converts the received serial data into parallel data. This parallel data is received by the first sink device 3. The parallel data received by the first sink device 3 includes a control signal from the second information source 8. The control signal may include information for controlling the operation conditions, the operation mode, and the like of various sensors such as an image sensor. The transmission and reception of control signals between the first sink device 3 and the uplink reception unit 12 are performed by, for example, I2C (Inter-Integrated Circuit) communication or GPIO (General Purpose Input/Output).

The second information source 8 transmits, to the uplink transmission unit 14 in the second SerDes unit 6, information to be transmitted to the first sink device 3. Further, the downlink reception unit 13 in the second SerDes unit 6 converts the received serial data into parallel data and transmits the parallel data to the second sink device 7.

Figure 2:
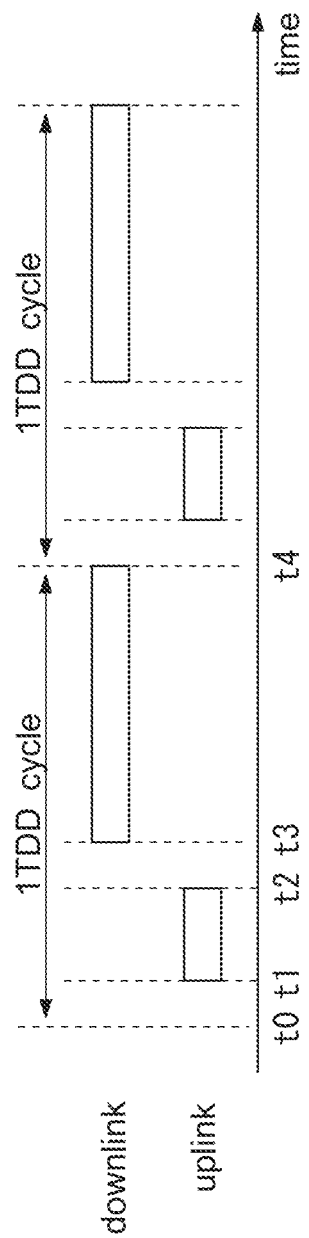
FIG. 2 is a diagram describing a TDD method.

As described above, the first SerDes unit 4 and the second SerDes unit 6 are capable of transmitting and receiving serial data by, for example, the TDD method. FIG. 2 is a diagram describing the TDD method. In this embodiment, assumption is made that sensing data of various sensors including, for example, an image sensor is transmitted from the first information source 2 to the second sink device 7 via the transmission path 5. Sensing data such as an imaging signal is transmitted by the downlink. Further, the control signal transmitted by the second information source 8 to the first sink device 3 is transmitted by the uplink. In the communications system 1 according to an embodiment of the present disclosure, the amount of information of the downlink on the transmission path 5 is much greater than the amount of information of the uplink. In view of the above, as shown in FIG. 2, the amount of information received and received is made different between the downlink and the uplink by making the period during which information of the downlink is received longer than the period during which information of the uplink is received. In the example of FIG. 2, information (control signal from the second information source 8, or the like) of the uplink is transmitted and received from a time t1 to a time t2, and then, information (sensing data from the first information source 2) of the downlink is transmitted and received from a time t3 to a time t4. Since the period from the time t3 to t4 is longer than the period from the time t1 to t2, it is possible to increase the amount of information of the downlink more than the amount of information of the uplink. The period from the time t0 to t4 is a 1 TDD cycle, and a plurality of TDD cycles is repeated.

Figure 3:
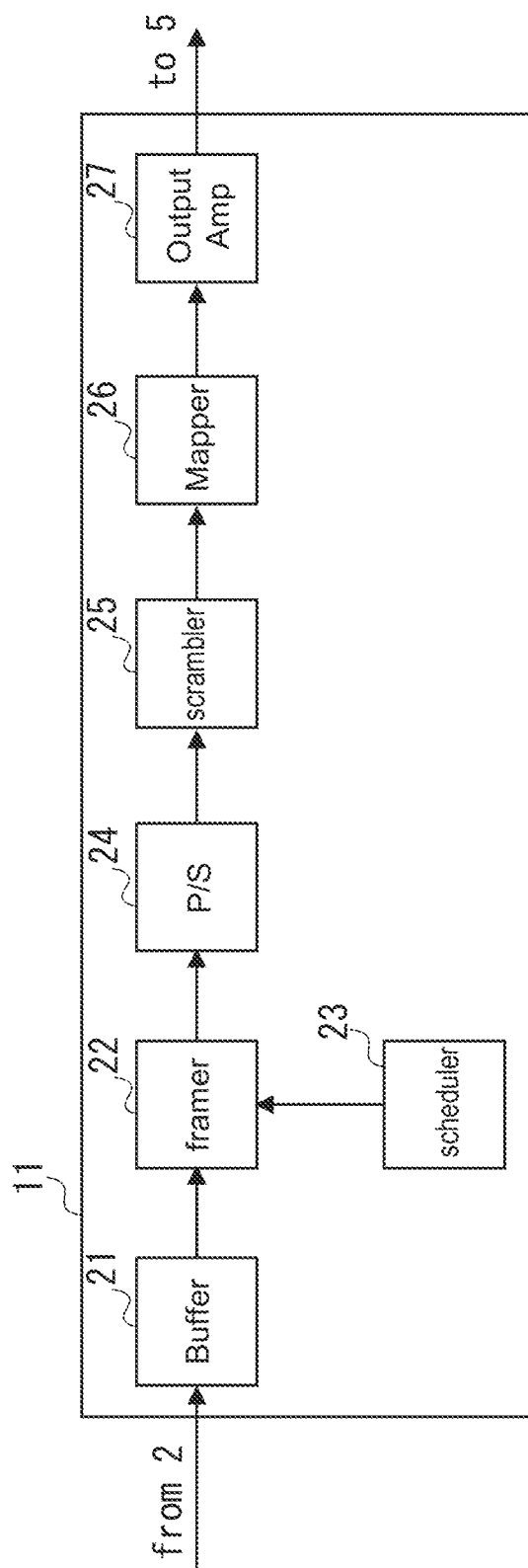
FIG. 3 is a block diagram showing an example of an internal configuration of a downlink transmission unit in FIG. 1.

FIG. 3 is a block diagram showing an example of an internal configuration of the downlink transmission unit 11 in FIG. 1. The downlink transmission unit 11 in FIG. 3 includes a buffer 21, a framer 22, a scheduler 23, a parallel-serial converter (P/S) 24, a scrambler 25, a mapper 26, and an output amplifier 27.

The buffer 21 temporarily holds information output from the first information source 2. The buffer 21 is provided to adjust the transmission rate. Since the data rate of sensing data output by various sensors included in the first information source 2 and the transmission rate of the transmission path 5 are generally different from each other, the rate is adjusted by the buffer 21 and information from the first information source 2 is transmitted to the framer 22 at appropriate timing. Note that normally, the transmission rate of the transmission path 5 is made higher than the data rate of the first information source 2.

The framer 22 generates packet data in units of frames on the basis of information transmitted from the first information source 2 in units of blocks. The data configuration of the packet data forming a frame will be described later. The P/S 24 converts the packet data generated by the framer 22 into serial data.

The scrambler 25 performs predetermined scrambling processing on the serial data output from the P/S 24 to generate scrambled data. For example, the scrambler 25 randomizes the timing at which the signal logical numbers of the serial data change. The scrambler 25 may generate scrambled data obtained by scrambling information generated by the first information source 2, regardless of whether or not the transmission of information to the transmission path 5 is stopped.

The mapper 26 converts the signal level in accordance with the modulation method (NRZ, PAM4, or the like). The output signal of the mapper 26 is input to the output amplifier 27.

The output amplifier 27 adjusts the gain of the output signal of the mapper 26 and transmits the output signal whose gain has been adjusted to the transmission path 5.

Figure 4:
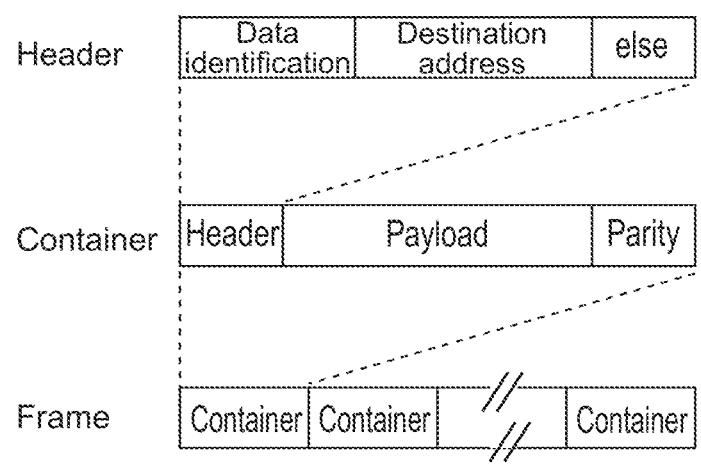
FIG. 4 is a diagram showing an example of a data configuration of a frame.

FIG. 4 is a diagram showing an example of the data configuration of a frame. As shown in FIG. 4, the frame has a plurality of containers. Each of the containers is generated in units of blocks within a frame. Each of the containers includes a header, a payload, and a parity.

The header includes, for example, address information indicating the destination of the payload. The payload is a body portion of data included in the signals to be transmitted and received. In addition to the video signal, the payload includes OAM (Operations, Administration, Maintenance) for controlling the first SerDes unit 4 and the second SerDes unit 6. The parity is a bit or a bit string for error detection or error correction processing of the payload. The header includes data identification information, a destination address, and additional information. The data identification information is information for identifying the type of data in the payload. The destination address is the address of a reception apparatus that receives the frame.

Figure 5:
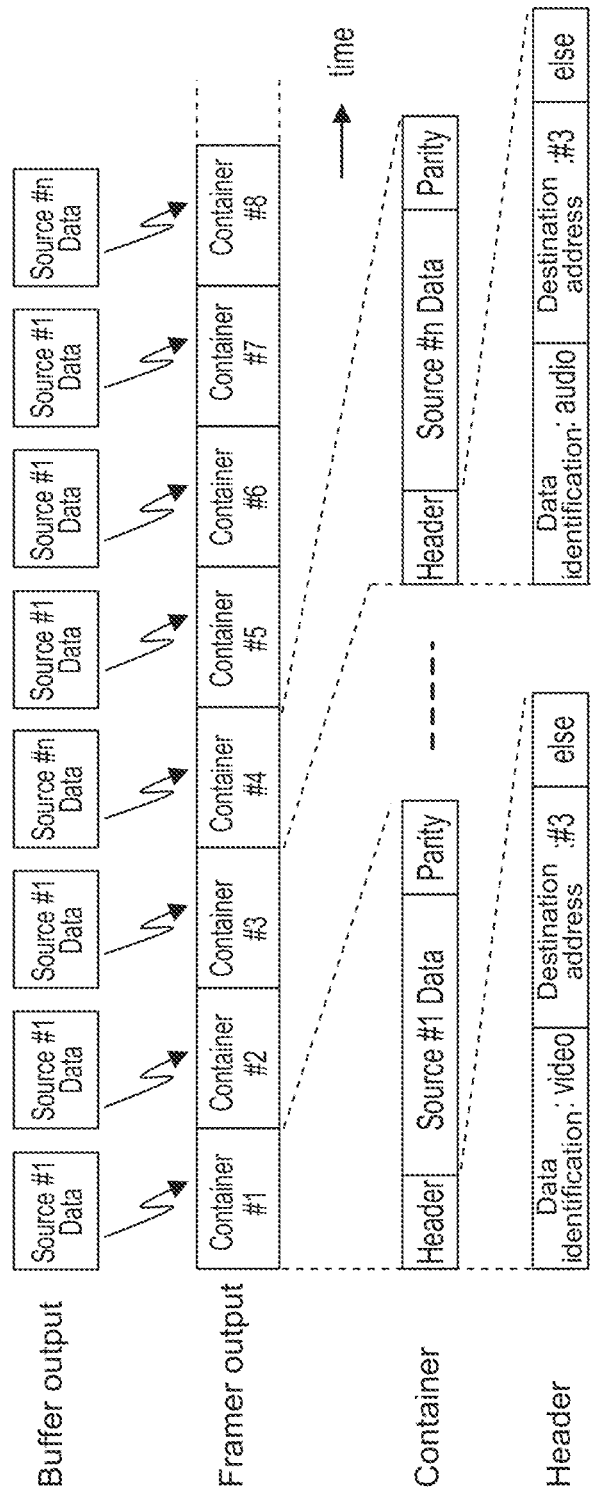
FIG. 5 is a diagram showing a data configuration of a frame output from a frame.

FIG. 5 is a diagram showing a data configuration of a frame output from the framer 22. FIG. 5 shows an example in which another information source (hereinafter, referred to as the n-th information source 2a (Source #n) is present in the communications system 1 in addition to the first information source 2. FIG. 5 shows an example in which the ratio of the data rates of the first information source 2, the n-th information source 2a, and the first SerDes unit 4 is 3:1:4.

As shown in FIG. 5, the framer 22 reads information temporarily held in the buffer 21, which is output from the first information source 2 and the n-th information source 2a, in accordance with the timing of the payload in the container on the basis of control from the scheduler 23. The framer 22 first stores information from the first information source 2 in the payload of the container (Containers #1 to #3), and adds data identification information (e.g., video signal), a destination address (address of the second sink device 7 (Sink #3) in this case), and a parity to the header to complete a container. The framer 22 sequentially generates three containers (Containers #1 to #3) based on information output from the first information source 2.

Next, the framer 22 stores information from the n-th information source 2a in the payload of the container (Container #4), and adds data identification information (e.g., audio signal), a destination address (the second sink device 7 (Sink #3)), and a parity to the header to complete a container. The framer 22 generates and outputs one container (Container #4) based on information output from the n-th information source 2a.

After that, the framer 22 repeats the processing of sequentially generating three containers (Containers #1 to #3) based on information from the first information source 2 and one container (Container #4) based on information from the n-th information source 2a. Thus, a frame including a plurality of containers is generated. The framer 22 sequentially outputs the generated containers.

The P/S 24 converts the containers sequentially output from the framer 22 into serial data. This serial data is input to the scrambler 25 bit-by-bit.

Figure 6:
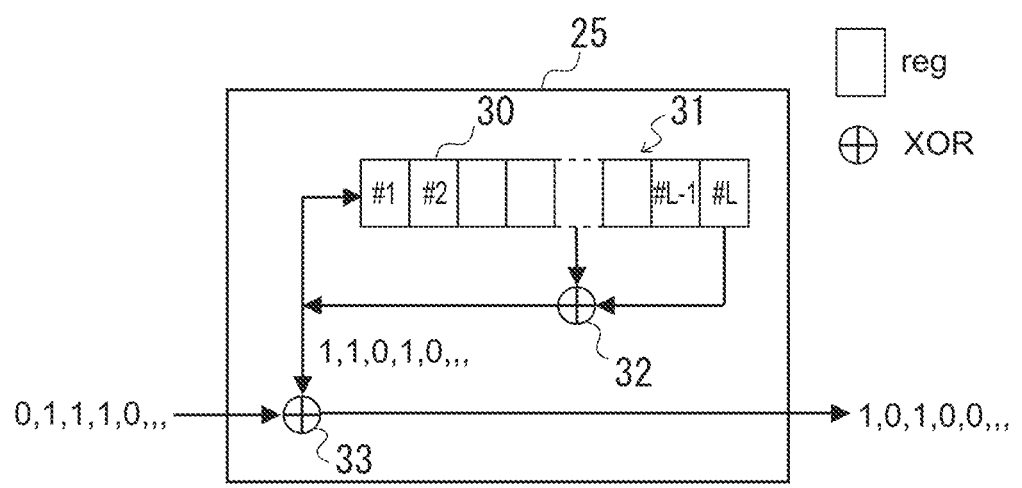
FIG. 6 is a block diagram showing an internal configuration of a scrambler.

FIG. 6 is a block diagram showing an example of an internal configuration of the scrambler 25. As shown in FIG. 6, the scrambler 25 includes a shift register 31 in which L (L is an integer equal to or greater than 2) resisters 30 are connected in series, a first XOR calculator 32, and a second XOR calculator 33.

The first XOR calculator 32 outputs the result of the exclusive-OR operation between the output data of the register at the final stage of the shift register 31 and the output data of some registers at a stage other than the last stage. The output data of the first XOR calculator 32 is input to the register at the first stage and the second XOR calculator 33. By feeding back the output data of the first XOR calculator 32 to the input side of the register at the first stage of the shift register 31, the shift register 31 is capable of randomly generating serial data from 1 to $2^L-1$ excluding zero. In this manner, a pseudo-random number can be generated by the shift register 31 and the first XOR calculator 32.

The second XOR calculator 33 outputs an operation result of the exclusive-OR of the serial data output from the P/S 24 and the output data of the first XOR calculator 32. Since the output data of the first XOR calculator 32 is a pseudo-random number, the output data of the second XOR calculator 33 is also pseudo-randomized serial data. The scrambler 25 outputs the output data of the second XOR calculator 33 as scrambled data.

In the case where information output from the first information source 2 is a video signal, long-serial data including bits of the same signal logical number (0 or 1) may be obtained. When such serial data is received by the downlink reception unit (Dn Rx) 13, there is a possibility that the synchronous reproduction of the received data cannot be performed correctly because there is no change point of the signal logical numbers. In view of this, in the scrambler 25, the serial data based on information from the first information source 2 is intentionally pseudo-randomized to forcibly cause a change in the signal logical numbers. As a result, the synchronous reproduction processing of the received data can be performed normally on the receiving side.

Figure 7A:
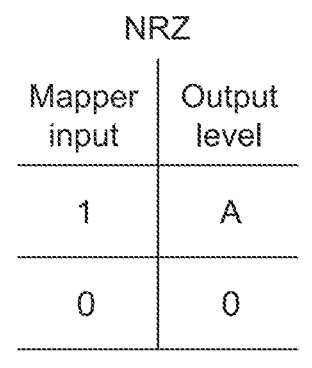

The scrambled data generated by the scrambler 25 is input to the mapper 26. The mapper 26 adjusts the output level of the scrambled data in accordance with the modulation method. FIG. 7A is a diagram showing an example of the output level in the case where the modulation method is NRZ (non-return-to-zero). FIG. 7B is a diagram showing an example of the output level in the case where the modulation method is PAM4 (4 Pulse Amplitude Modulation). In the case of NRZ, the output level is set to a predetermined voltage level A if the scrambled data is 1 as shown in FIG. 7A, and the output level is set to 0 if the scrambled data is 0. In the case of PAM4, as shown in FIG. 7B, the output level is set to a predetermined voltage level B if two consecutive bits of the scrambled data are (1, 0), the output level is set to ⅔ of B if the two consecutive bits are (1, 1), the output level is set to ⅓ of B if the two consecutive bits are (0, 1), and the output level is set to 0 if two consecutive bits are (0, 0). Serial data whose output level has been adjusted by the mapper 26 is transmitted to the transmission path 5 via the output amplifier 27.

In FIG. 5 described above, an example in which the transmission path 5 has the transmission capacity for sequentially transmitting four containers including three containers from the first information source 2 and one container from the n-th information source 2a has been shown. For example, in the case where the n-th information source 2a does not output information, the framer 22 generates only three containers despite the fact that the transmission path 5 has the transmission capacity corresponding to four containers, which reduces the transmission efficiency.

Figure 8:
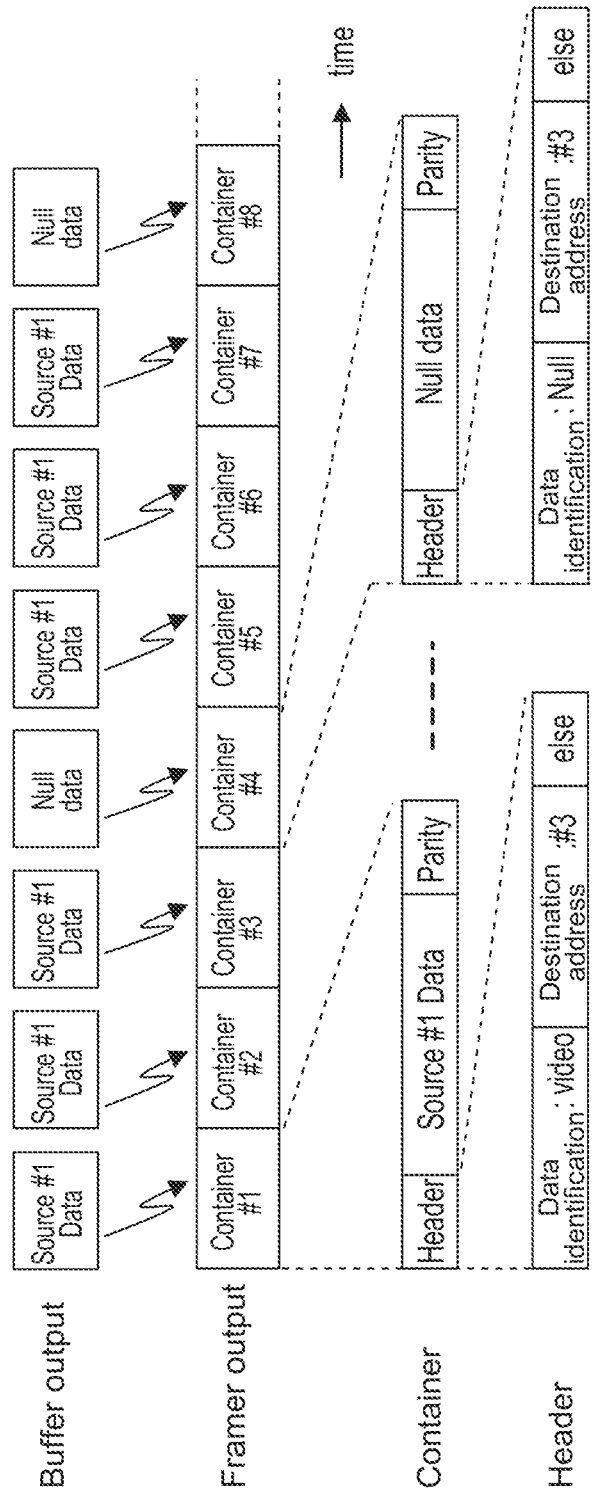
FIG. 8 is a diagram showing a data configuration of a frame output from a framer in the case where the n-th information source does not output information.

FIG. 8 is a diagram showing a data configuration of a frame output from the framer 22 in the case where the n-th information source 2a does not output information. The buffer 21 outputs null data, which is invalid data, at the time when the n-th information source 2a has been supposed to output information. For this reason, the payload of the container (Container #4) includes null data, and the data identification information in the header is null.

Information having an amount corresponding to the transmission capacity of the transmission path 5 can be transmitted by providing the container including null data, but the container including null data is meaningless information and only consumes power wastefully. For this reason, it is desirable to partially change the internal configuration of the downlink transmission unit 11 shown in FIG. 3 so as not to wastefully consume power in the case where the amount of information to be transmitted is less than the transmission capacity of the transmission path 5. Hereinafter, a first improvement example to a third improvement example in which the internal configuration of the downlink transmission unit 11 in FIG. 3 is changed will be described in order.

(First Improvement Example of Downlink Transmission Unit 11)

Figure 9:
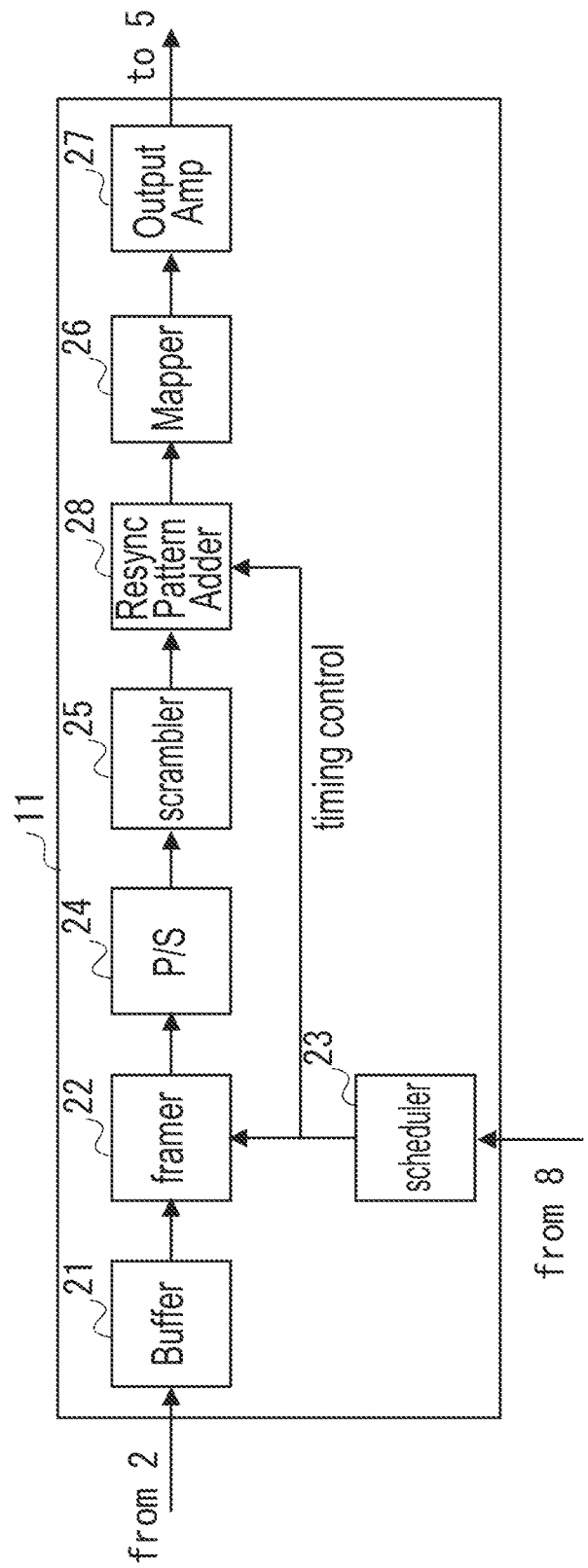
FIG. 9 is a block diagram of a first improvement example of downlink transmission unit in FIG. 3.

FIG. 9 is a block diagram of a first improvement example of the downlink transmission unit 11 in FIG. 3. The downlink transmission unit 11 in FIG. 9 includes a resynchronization pattern adder (Resync Pattern Adder) 28 in addition to the configuration in FIG. 3. The resynchronization pattern adder 28 stops transmission of information to the transmission path 5 in one of several blocks in the frame in the case where the amount of information to be transmitted is less than the transmission capacity of the transmission path 5.

The resynchronization pattern adder 28 processes the scrambled data output from the scrambler 25, and transmits the processed serial data to the mapper 26. The resynchronization pattern adder 28 determines the timing when the transmission of information to the transmission path 5 is stopped, on the basis of control by the scheduler 23.

Figure 10:
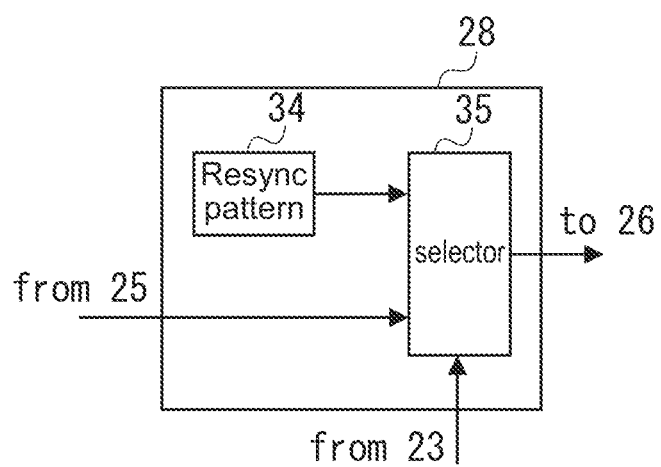
FIG. 10 is a block diagram showing an example of an internal configuration of a resynchronization pattern adder.

FIG. 10 is a block diagram showing an example of an internal configuration of the resynchronization pattern adder 28. The resynchronization pattern adder 28 includes a resynchronization pattern generator 34 and a selector 35. The resynchronization pattern generator 34 generates a resynchronization pattern after stopping the transmission of information to the transmission path 5 and before resuming transmission of information to the transmission path 5. The resynchronization pattern is received by a reception apparatus (downlink reception unit (Dn Rx) 13) that receives information and is used for performing synchronous regeneration processing of information.

The selector 35 selects, on the basis of the timing control by the scheduler 23, one of the scrambled data output from the scrambler 25 and the resynchronization pattern generated by the resynchronization pattern generator 34. The data selected by the selector 35 is transmitted to the mapper 26.

In describing the processing operation of the downlink transmission unit 11 in FIG. 9, assumption is made that the ratio of the transmission rates per unit time of the first information source 2 and a transmission apparatus is 3:4.

Therefore, by stopping the transmission of one container with respect to four containers, the transmission rate of the first information source 2 and the transmission rate of the transmission apparatus can be substantially matched with each other.

Figure 11A:
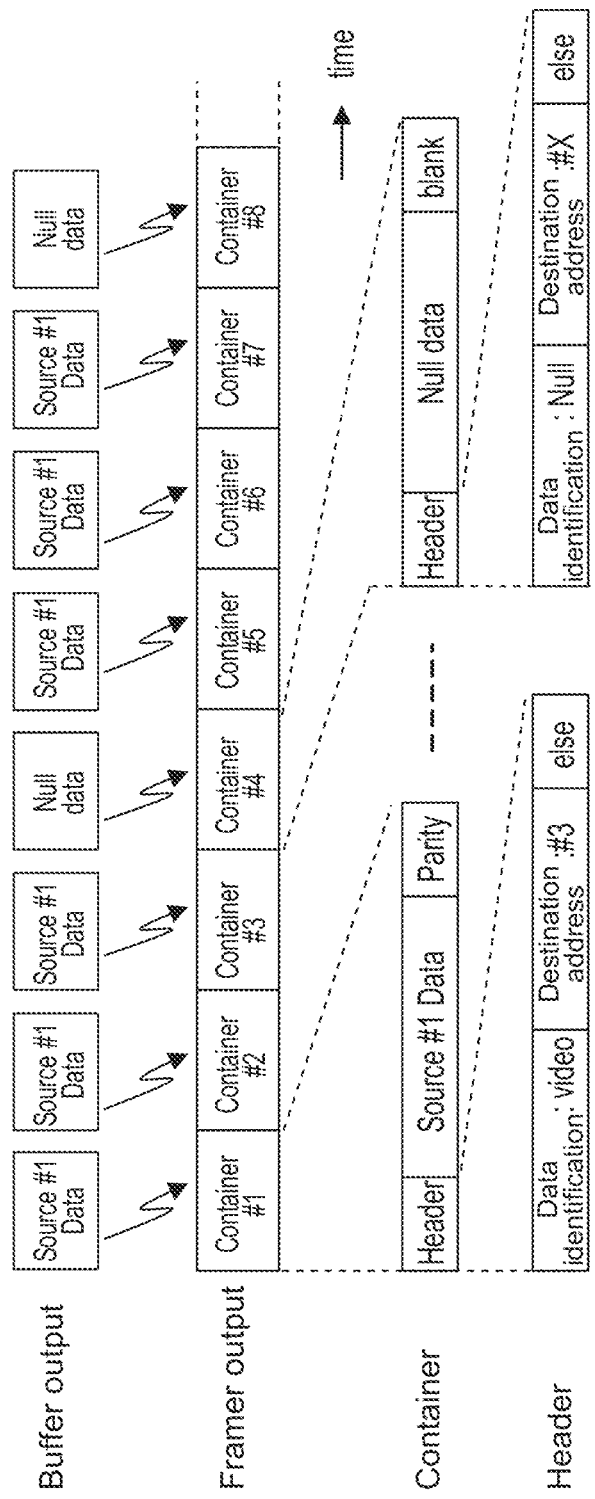
FIG. 11A is a diagram showing output data of a framer according to a first improvement example.

FIG. 11A, FIG. 11B, FIG. 11C, and FIG. 11D are each a timing diagram of the respective units in the downlink transmission unit 11 according to the first improvement example. As shown in FIG. 11A, information from the first information source 2 temporarily stored in the buffer 21 is sequentially input to the framer 22, and the input information is stored in the payload of the container. Further, data identification information, a destination address, and a parity are input to the header of the container. When information having the amount corresponding to three consecutive containers (Containers #1 to #3) is input from the buffer 21, then invalid data is stored in the payload of the container (Container #4) and null is input to the data identification information in the header. An invalid address (address #X) that is not present in this communications system 1 is input to the destination address. Since this container transmits null data to invalid addresses, the error correction processing is stopped in order to reduce power consumption as much as possible. Therefore, since the parity is not necessary, so it is remained to be blank.

By making the destination address of the container (Container #4) an invalid address, the container can be ignored on the receiving side and the reception processing can be omitted.

In the example of FIG. 11A, one of four consecutive containers is invalid data. The ratio of containers to be invalid data depends on the relationship between the amount of information of the first information source 2 and the transmission capacity of the transmission path 5. Depending on the relationship, the ratio may differ from that in FIG. 11A. To which information the container corresponding, of pieces of information temporarily stored in the buffer 21, is to be set to null data is controlled by the timing control signal from the scheduler 23. The scheduler 23 may also generate a timing control signal pn the basis of setting information from the second information source 8.

Figure 11B:
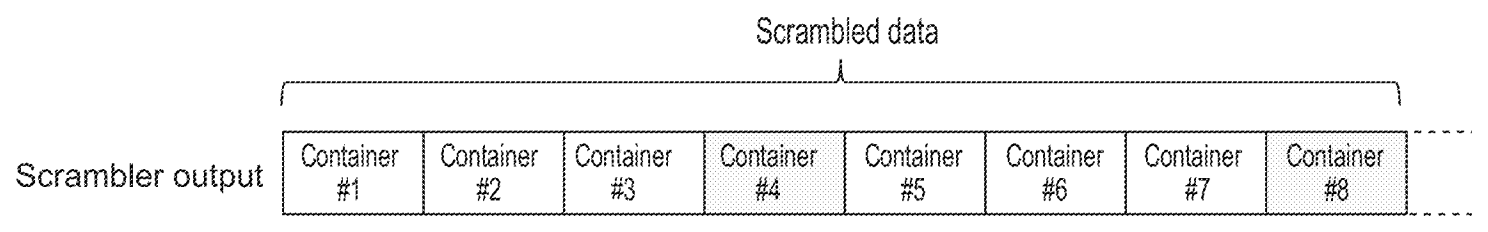

The framer 22 sequentially outputs the individual forming the frame. The P/S 24 sequentially converts the containers output from the framer 22 into serial data. The scrambler 25 scrambles the serial data to generate scrambled data. As shown in FIG. 11B, the scrambled data is generated for each of the containers output from the framer 22. The scrambler 25 generates scrambled data corresponding to null data for one of the four containers.

Figure 11C:
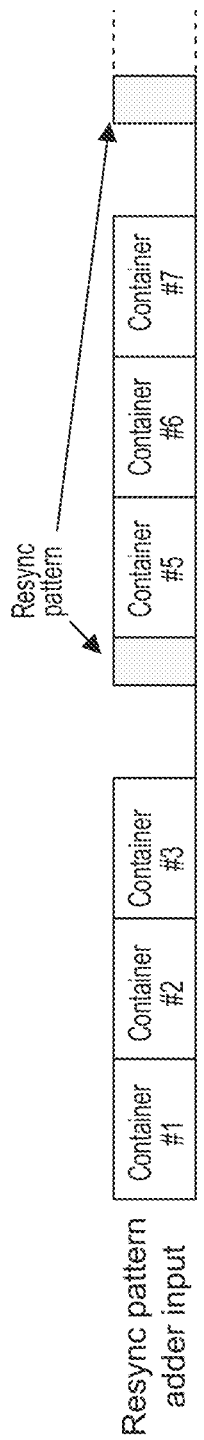
FIG. 11C is a diagram showing output data of a resynchronization pattern adder according to the first improvement example.

The resynchronization pattern adder 28 removes the scrambled data corresponding to the null data on the basis of the timing control signal from the scheduler 23, as shown in FIG. 11C. As a result, the transmission of information from the first SerDes unit 4 to the second SerDes unit 6 is stopped. While stopping the transmission of information, the signal logical number of the downlink on the transmission path 5 is fixed to one of 0 and 1, or is set to a high impedance. Therefore, it is possible to minimize consumption energy on the transmission path 5.

Further, as shown in FIG. 11C, the resynchronization pattern adder 28 transmits a resynchronization pattern of a predetermined length to the transmission path 5 after stopping the transmission of information once and before resuming the transmission of information.

The resynchronization pattern is favorably a randomized pattern such as s PRBS (Pseudorandom Binary Sequence). The resynchronization pattern includes a part where the signal logical numbers of 0 and 1 change, and it is possible to generate a clock signal for performing synchronous reproduction of information received thereafter on the receiving side that has received the resynchronization pattern by using the resynchronization pattern.

The resynchronization pattern adder 28 outputs the corresponding scrambled data as it is for the container corresponding to the valid data. The mapper 26 adjusts the output level of the output data of the resynchronization pattern adder 28 in accordance with the modulation method. The output amplifier 27 adjusts the gain of the output data of the mapper 26 and then transmits the output data whose gain has been adjusted to the transmission path 5.

Figure 11D:
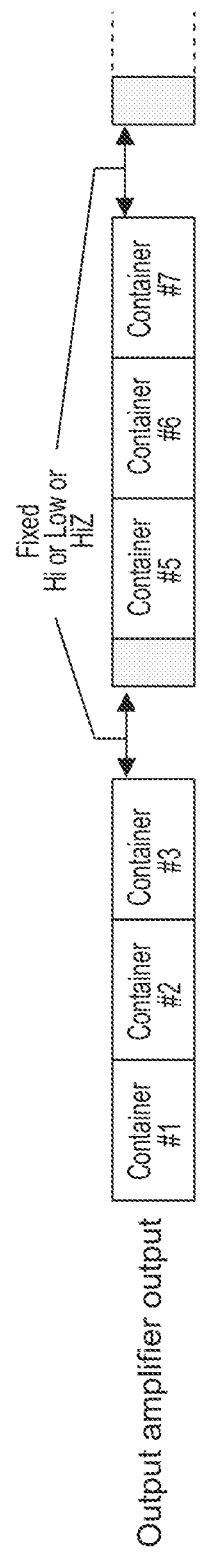
FIG. 11D is a diagram showing output data of an output amplifier according to the first improvement example.

As shown in FIG. 11D, the output amplifier 27 temporarily stops the transmission of information and fixes the signal level of the transmission path 5 or set the signal level to a high impedance level during the period in which the container of the null data is transmitted. After that, the output amplifier 27 transmits the resynchronization pattern to the transmission path 5 before resuming transmission of information.

As described above, in the case where the amount of information of the first information source 2 is less than the transmission capacity of the transmission path 5, the downlink transmission unit 11 according to the first improvement example temporarily stops transmission of information to the transmission path 5 when transmitting the container with invalid information in the frame, and then transmits the resynchronization pattern to the transmission path 5 before resuming transmission of information. In accordance with the first improvement example, it is unnecessary to transmit invalid information to the transmission path 5, so that consumption energy at the time of transmission can be suppressed. Further, since a resynchronization pattern is transmitted to the transmission path 5 before resuming transmission of information to the transmission path 5, clocks for performing synchronous regeneration of information can be generated on the basis of the resynchronization pattern on the receiving side. Therefore, it is possible to reliably perform the synchronous reproduction processing of information on the receiving side when the transmission of information to the transmission path 5 is stopped once and then the transmission of information is resumed.

(Second Improvement Example of Downlink Transmission Unit 11)

Figure 12:
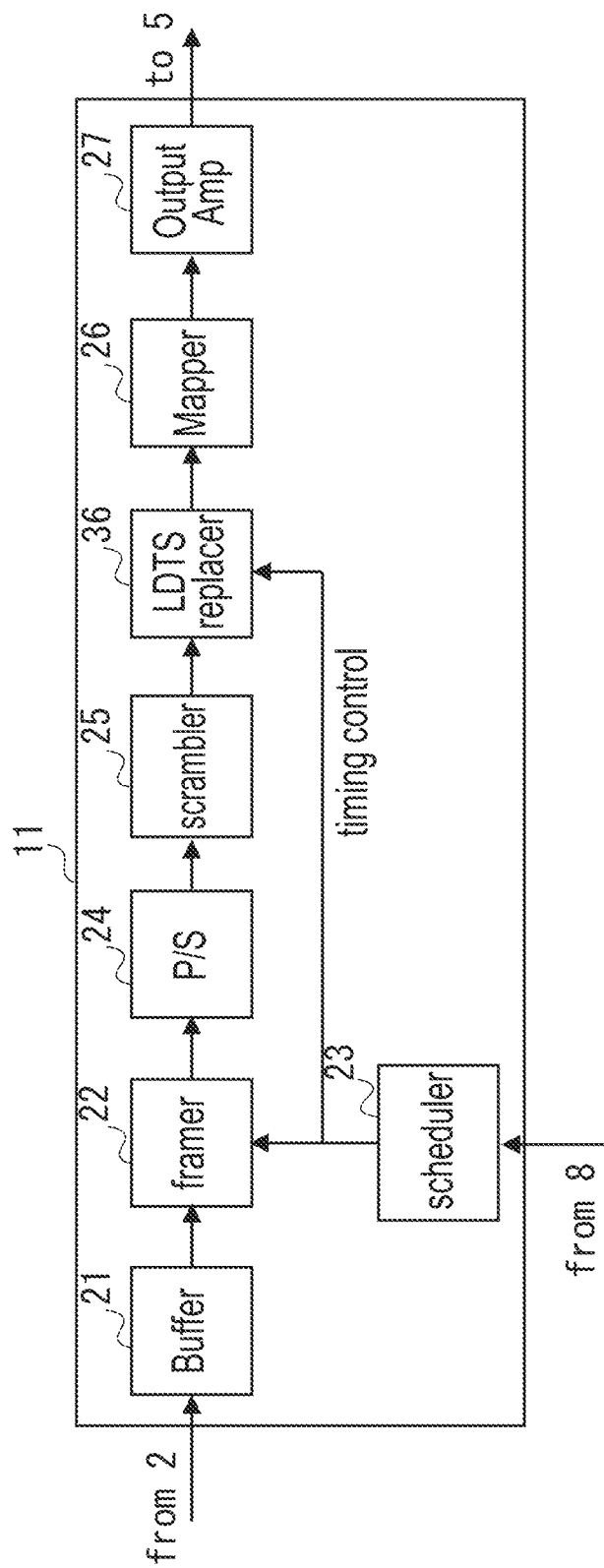
FIG. 12 is a block diagram of a downlink transmission unit in FIG. 3 according to a second improved embodiment.

FIG. 12 is a block diagram of the downlink transmission unit 11 in FIG. 3 according to a second improvement example. The downlink transmission unit 11 in FIG. 12 includes an LDTS replacement unit (Low Density Toggle Signal Replacer) 36 instead of the resynchronization pattern adder 28 in FIG. 9. In the case where the amount of information to be transmitted is less than the transmission capacity of the transmission path 5, the LDTS replacement unit 36 generates toggle data having a cycle of transition of information in one of several blocks in the frame longer than that of information in a block in the frame other than the one block. That is, in one of several blocks in the frame, the period in which information transits is made longer. The toggle data having such a long cycle is herein referred to as low density (or low cycle) toggle data. Note that transition of information refers to that the signal logical value on the transmission path 5 changes from 0 to 1 or from 1 to 0.

Figure 13:
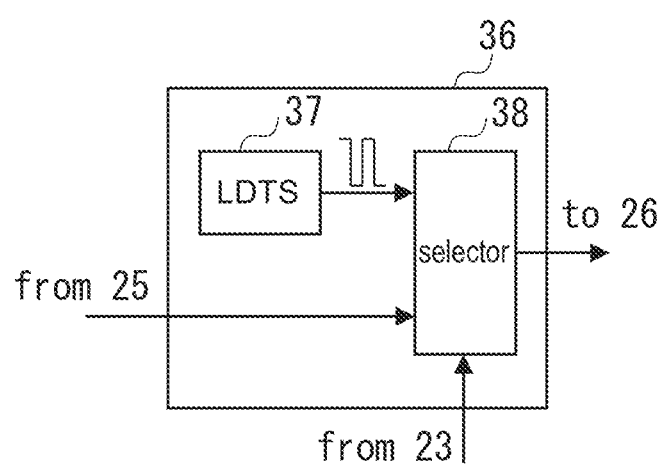
FIG. 13 is a block diagram showing an example of an internal configuration of an LDTS replacement unit.

FIG. 13 is a block diagram showing an example of an internal configuration of the LDTS replacement unit 36. As shown in FIG. 13, the LDTS replacement unit 36 includes an LDTS generator 37 that generates toggle data (hereinafter, referred to also as LDTS), and a selection unit 38. The toggle data generated by the LDTS generator 37 is data whose signal logical number changes in a cycle corresponding to the number of connected stages L of the series-connected registers included in the shift register 31 shown in FIG. 6 in the scrambler 25.

As a more specific example, the LDTS generator 37 generates toggle data including consecutive 1s having the number of bits corresponding to the number of a plurality of registers in the shift register 31 in one of several blocks in a frame, and consecutive 0s having the number of bits corresponding to the number obtained by subtracting 1 from the number of the plurality of registers in the shift register 31.

Alternatively, as will be described below, the LDTS generator 37 may generate toggle data including consecutive 1s having the number of bits corresponding to the number selected, by a predetermined method, from the number of the plurality of registers in the shift register 31 and the number obtained by subtracting 1 from the number of the plurality of registers in the shift register 31, and consecutive 0s having the number of bits corresponding to the number selected, by a predetermined method, from the number obtained by subtracting 1 from the number of the plurality of registers in the shift register 31 and the number obtained by subtracting 2 from the number of the plurality of registers in one of several blocks in the frame. As a method of performing the above-mentioned selection, the LDTS generator 37 is capable of using, for example, a method of making random selection using a random number generator, or a method of making selection on the basis of a preset value.

In describing the processing operation of the downlink transmission unit 11 in FIG. 12, assumption is made that the ratio of the transmission rates of the first information source 2 and the transmission apparatus per unit time is 3:4.

Figure 14A:
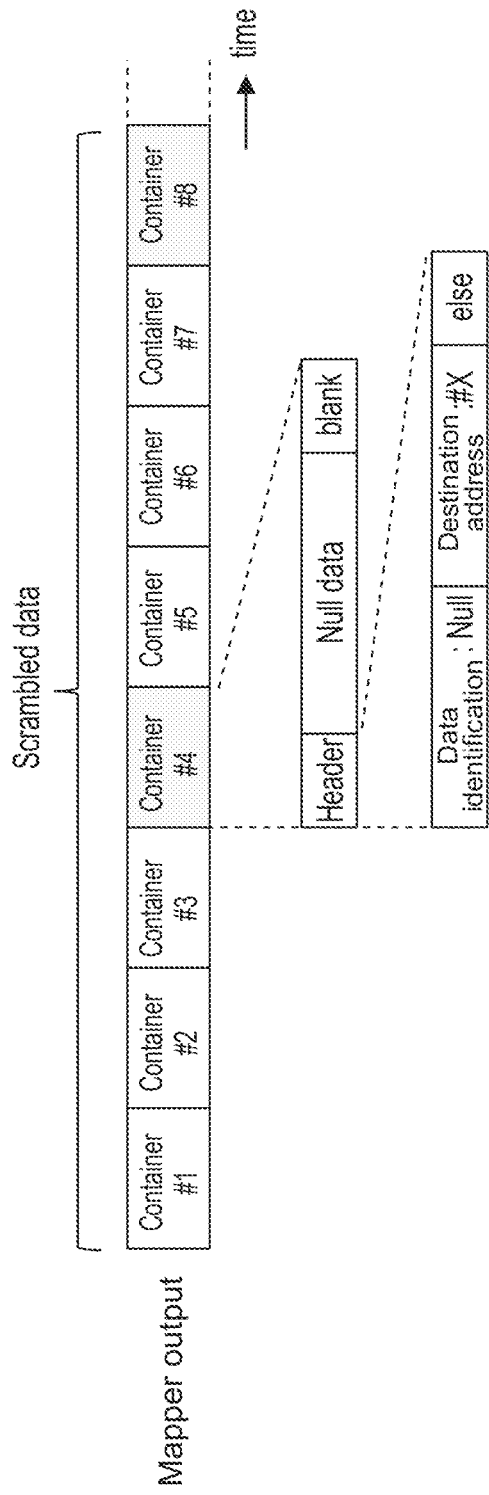
FIG. 14A is a diagram showing a data configuration of scrambled data output from a scrambler.

FIG. 14A is a diagram showing a data configuration of scrambled data output from the scrambler 25. Scrambled data corresponding to three containers (Containers #1-#3) each including valid information is placed followed by scrambled data corresponding to one container (Container #4) including invalid information. The scrambled data corresponding to these four containers is sequentially output from the scrambler 25. The payload of the container (Container #4) including invalid information includes invalid data, the data identification information of the header is null, and the destination address may be set to an address that is not present in the communications system 1.

Figure 14B:
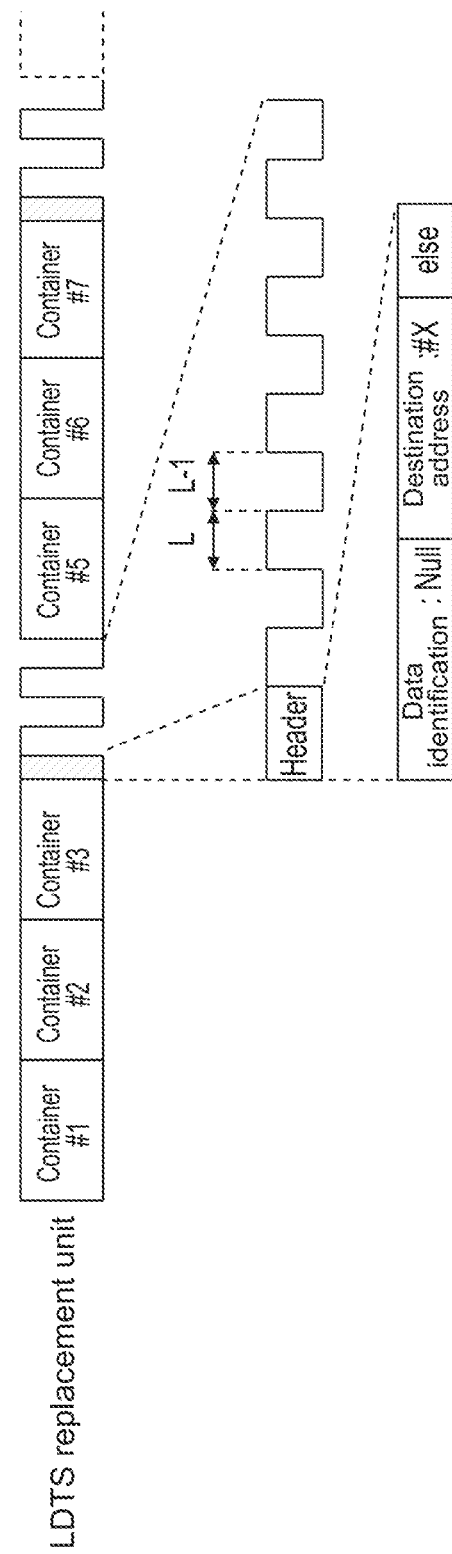
FIG. 14B is a diagram showing output data of an LDTS replacement unit.

FIG. 14B is a diagram showing output data of the LDTS replacement unit 36. In response to the timing control signal from the scheduler 23, the LDTS replacement unit 36 leaves the header of the container (Container #4) including the null data as it is. This is different from the first improvement example in which the header of the container including null data is removed as shown in FIG. 11. Further, the LDTS replacement unit 36 inserts toggle data (LDTS), which is low-density and whose signal logical numbers change, into the container instead of the payload and parity of the container including null data. More precisely, since the LDTS replacement unit 36 is provided at the subsequent stage side of the scrambler 25, the header portion of the scrambled data corresponding to the container including the null data is left as it is, and the portion corresponding to the payload and the parity of the container is replaced with low-density toggle data. The reason why the header is left as it is to enable the second sink device 7 that has received the low-cycle toggle data to grasp the type of the received toggle data.

The cycle in which 1s and 0s of the toggle data continue is caused to depend on the number of connected stages L of the resister 30 of the shift register 31 shown in FIG. 6 in the scrambler 25. The shift register 31 shown in FIG. 6 shifts the serial data between the plurality of registers for each cycle of the clock signal.

For this reason, the maximum duration of the output data "1" of the shift register 31 is the number of bits of the number of connected stages L of the resister 30, and the maximum duration of the output data "0" is the number of bits corresponding to the number obtained by subtracting 1 from the number of connected stages L of the register. Therefore, in the output data of the shift register 31, the toggle ratio of 1 and 0 is minimized when 1 continues by L bits and 0 continues by L−1 bits. In this regard, the LDTS generator 37 generates toggle data in which 1 continues by L bits and 0 continues by L−1 bits.

The LDTS replacement unit 36 outputs scrambled data corresponding to the container including no null data as it is, replaces the payload and parity of the container of scrambled data corresponding to the container including null data with toggle data generated by the LDTS generator 37 while leaving the header without change, and outputs the scrambled data.

The output data of the LDTS replacement unit 36 is input to the mapper 26, converted into a signal level corresponding to the modulation method, input to the output amplifier 27, adjusted in gain, and then transmitted to the transmission path 5. The output amplifier 27 transmits, to the transmission path 5, data of all of the containers corresponding to all pieces of information output by the first information source 2.

As described above, in the downlink transmission unit 11 according to the second improvement example, regarding the container including null data, the toggle data with the smallest toggle rates of 1 and 0 is transmitted to the transmission path 5 instead of the payload and parity of the container leaving the header without change. Therefore, the second SerDes unit 6 that has received the toggle data and the corresponding header recognizes by the header that the toggle data is data for reproduction synchronization, is capable of generating a clock signal for synchronous reproduction using the toggle data, and is capable of performing the synchronous regeneration processing normally on the basis of to the toggle data when the transmission of information is resumed thereafter.

The LDTS generator 37 in FIG. 13 constantly generates toggle data in which 1 continues by L bits and 0 continues by L−1 bits. For this reason, the frequency of the toggle data becomes fixed, and there is a possibility that EMI (Electro Magnetic Interference) noise caused by this frequency is generated. In this regard, the frequency of the toggle data may be changed randomly while not increasing the consumption energy in the transmission path 5.

Figure 15:
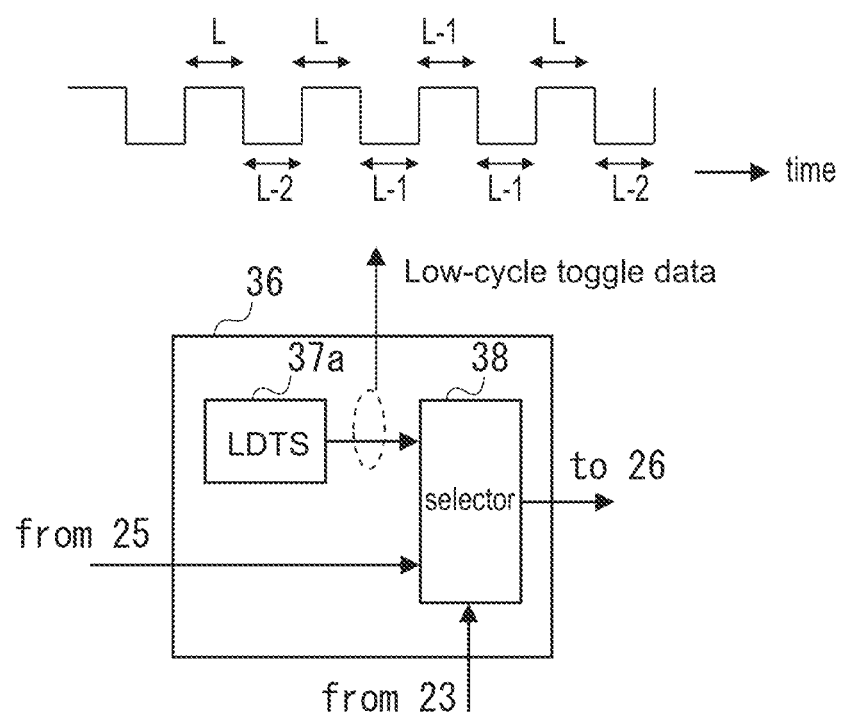
FIG. 15 is a block diagram showing an internal configuration of an LDTS generator according to a modified example.
Figure 16:
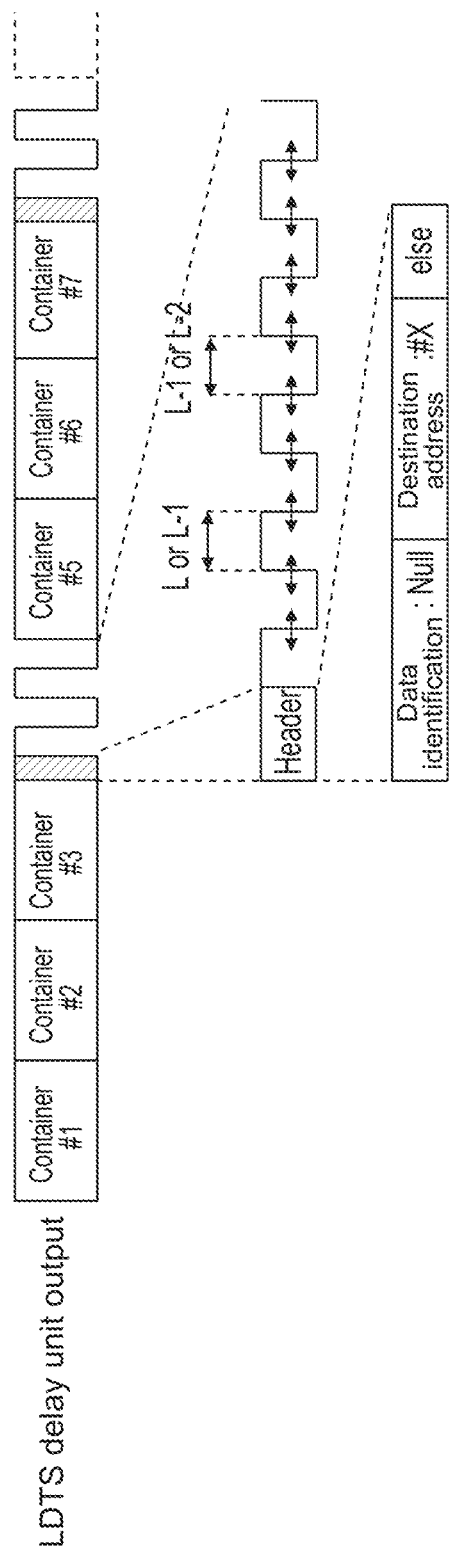
FIG. 16 is a diagram showing output data of an LDTS replacement unit.

FIG. 15 is a block diagram showing an internal configuration of the LDTS generator 37 in FIG. 13 according to a modified example, and FIG. 16 is a diagram showing output data of the LDTS replacement unit 36. The LDTS generator 37 in FIG. 15 includes an LDTS generator 37a having a configuration different from that of the LDTS generator 37 in FIG. 13. The selection unit 38 in FIG. 15 is similar to the selection unit 38 in FIG. 13.

In the LDTS generator 37a in FIG. 15, every time the toggle data is output as "1", the duration of the toggle data is set to the number of bits corresponding to the number of bits corresponding to the number selected, by predetermined method, from one of the number of connected stages L of the plurality of registers constituting the shift register 31 in the scrambler 25 and L−1 which is less than that by 1. In addition, every time the toggle data is output as "0", the duration of the toggle data is set to the number of bits corresponding to the number selected, by a predetermined method, from one of L−1 and L−2.

As a result, as shown in FIG. 16, the toggle data included in the output data of the LDTS replacement unit 36 is not likely to be biased to a specific frequency. Although the toggle rate of the toggle data generated by the LDTS generator 37a in FIG. 15 is slightly higher than that of the toggle data generated by the LDTS generator 37 in FIG. 13, the toggle rates of 1 and 0 can be much smaller than that of scrambled data including valid information, and power consumption can be suppressed.

As described above, in the downlink transmission unit 11 according to the second improvement example, since toggle data with a sufficiently small toggle rate and the header for identifying the toggle data are transmitted to the transmission path 5 when information of the container including null data is transmitted to the transmission path 5, power consumption on the transmission path 5 can be sufficiently small.

(Third Improvement Example of Downlink Transmission Unit 11)

Figure 17:
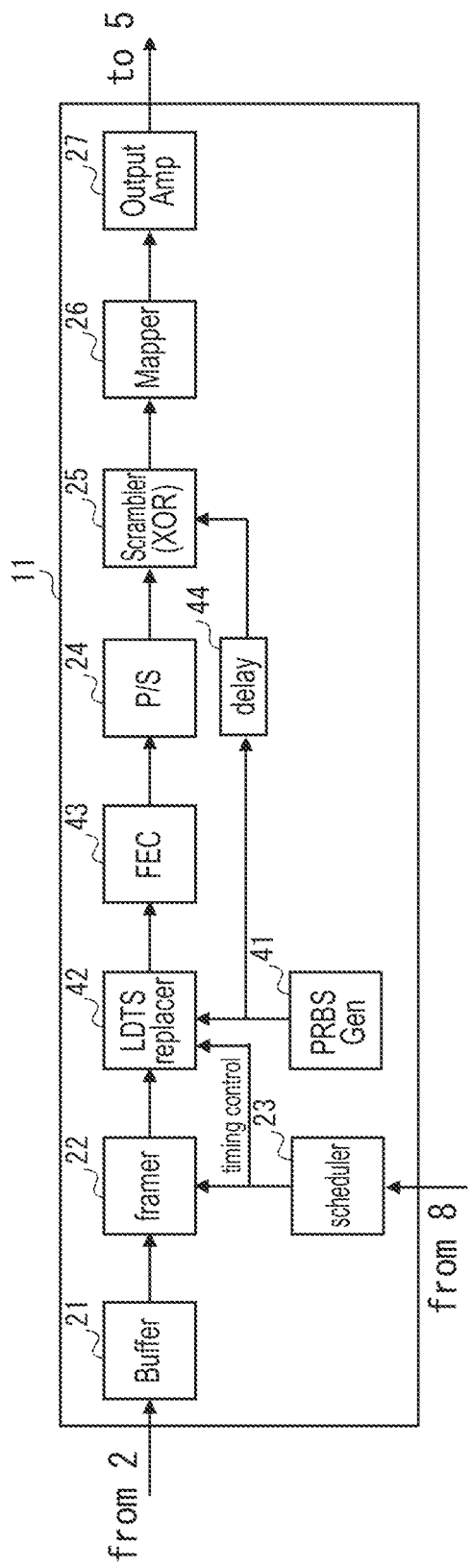
FIG. 17 is a block diagram of the downlink transmission unit of FIG. 3 according to a third improved embodiment.

FIG. 17 is a block diagram of the downlink transmission unit 11 of FIG. 3 according to a third improvement example. The downlink transmission unit 11 in FIG. 17 includes an PRBS generator (pseudo-random number device) 41, an LDTS replacement unit 42, an FEC (Forward Error Correction) unit 43, and a delayer 44 instead of the resynchronization pattern adder 28 in FIG. 9.

The PRBS generator 41 generates a pseudo-random number bit string. The internal configuration of the PRBS generator 41 includes, for example, a shift register including a plurality of registers, and an XOR calculator that calculates an exclusive-OR of the output of a register at the final stage in the shift register and the output of an arbitrary register at a stage other than the last stage, similarly to FIG. 6, and the output signal of the XOR calculator is input to the register at the first stage in the shift register. Note that since the specific internal configuration of the PRBS generator 41 is not limited, various modifications are conceivable.

The LDTS replacement unit 42 selects the pseudo-random number bit string generated by the PRBS generator 41 in one of several blocks in the frame, and selects the container output from the framer 22 in the other blocks.

Figure 18:
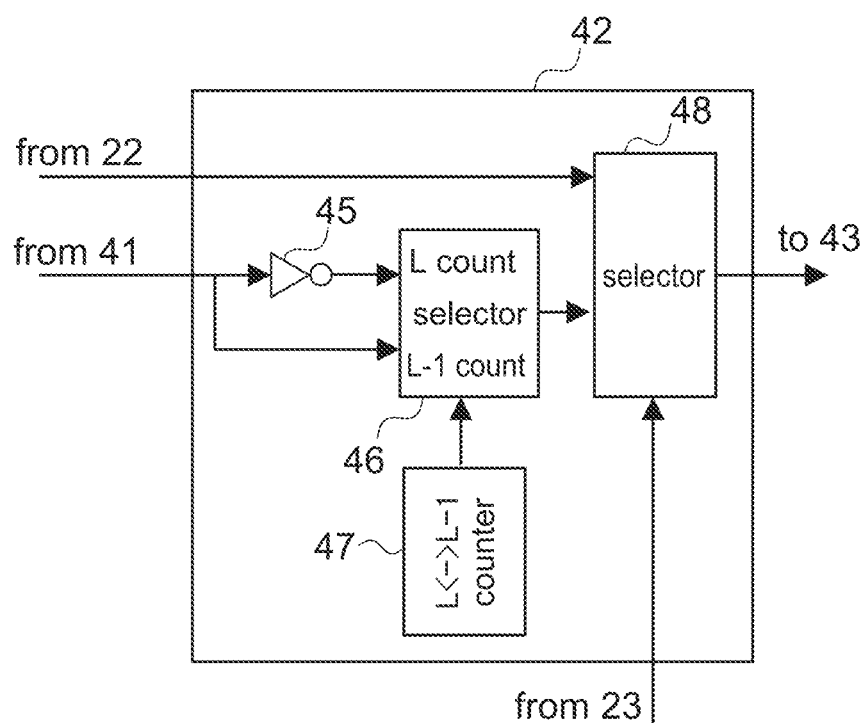
FIG. 18 is a block diagram showing an example of an internal configuration of an LDTS replacement unit.
Figure 19A:
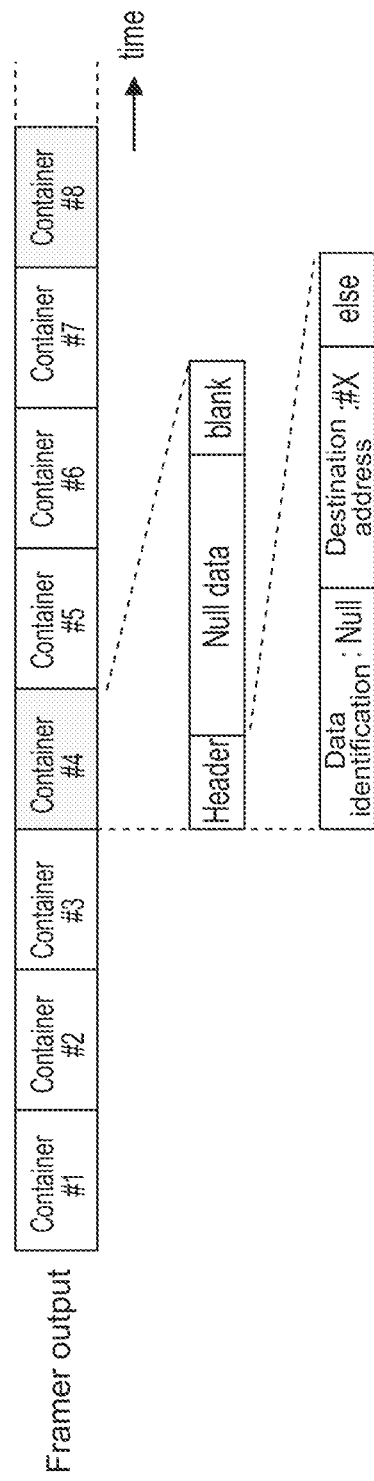
FIG. 19A is a diagram showing an example of a container output from a framer.

FIG. 18 is a block diagram showing an example of the internal configuration of the LDTS replacement unit 42. Further, FIG. 19A is a diagram showing an example of the container output from the framer 22. The destination address of the header of the container corresponding to one of several blocks in the frame stores an invalid address that is not used in the communications system 1, and the payload stores null data. By storing an invalid address in the destination address, the reception processing on the receiving side can be simplified, and power consumption can be reduced.

The LDTS replacement unit 42 in FIG. 18 includes an inverter 45, a first selector 46, a counter 47, and a second selector 48. The inverter 45 inverts the pseudo-random number bit string generated by the PRBS generator 41. Hereinafter, the output of the inverter 45 will be referred to as an inverted pseudo-random number bit string. The counter 47 alternately counts L bits and L−1 bits.

The first selector 46 selects an inverted pseudo-random number bit string while the counter 47 is counting L bits and a pseudo-random number bit string while the counter 47 is counting L−1 bits. The second selector 48 selects the output signal of the container output from the framer 22 or the output signal of the first selector 46 on the basis of the control signals from the scheduler 23. The signal selected by the second selector 48 is the output signal of the LDTS replacement unit 42.

Figure 19B:
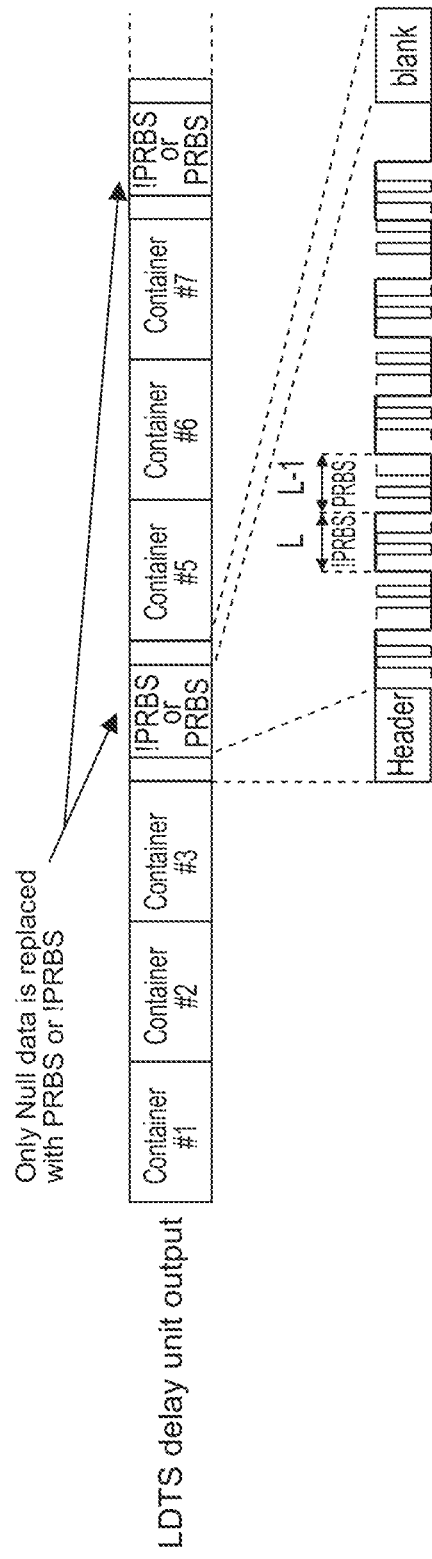
FIG. 19B is a diagram showing an example of output data of an LDTS replacement unit.

FIG. 19B is a diagram showing an example of the output data of the LDTS replacement unit 42. As shown in FIG. 19B, an inverted pseudo-random number bit string corresponding to L bits and a pseudo-random number bit string corresponding to L−1 bits are alternately output in one of several blocks in the frame. In FIG. 19B, the inverted pseudo-random number bit string is denoted as !PRBS, and the pseudo-random number bit string is denoted as PRBS.

The FEC unit 43 adds an error correcting code to the output signal of the LDTS replacement unit 42. The P/S 24 converts the output signal of the FEC unit 43 into serial data.

Figure 19C:
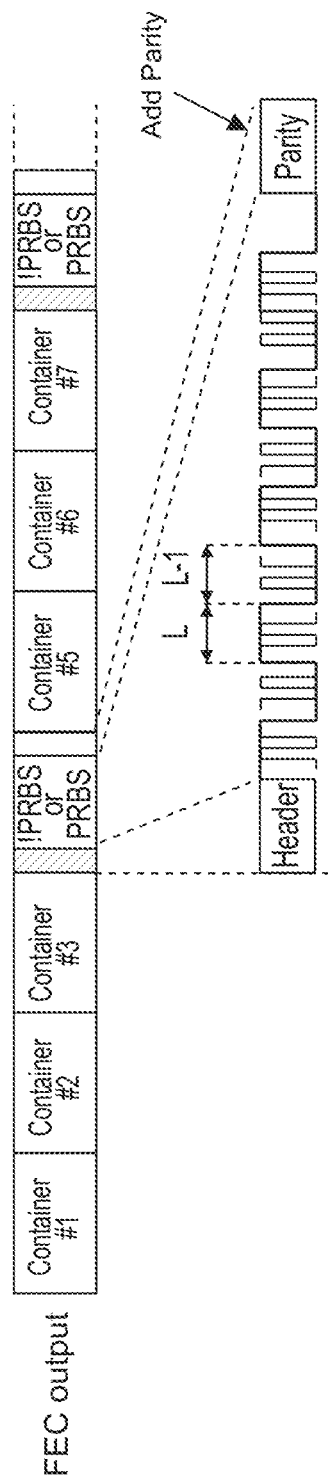
FIG. 19C is a diagram showing an example of an output signal of an FEC unit.

FIG. 19C is a diagram showing an example of the output signal of the FEC unit 43. The FEC unit 43 adds an error correction code (Parity) to each of the containers corresponding to each of the blocks. For example, an error correction code is added to the end of the pseudo-random number bit string replaced by the LDTS replacement unit 42.

The delayer 44 delays the pseudo-random number bit string output from the PRBS generator 41 by the time necessary for the pseudo-random number bit string output from the PRBS generator 41 to pass through the LDTS replacement unit 42, the FEC unit 43, and the P/S 24.

The scrambler 25 performs an exclusive OR operation on the serial data output from the P/S 24 and the pseudo-random number bit string output from the delayer 44. More specifically, the scrambler 25 repeats the operation of outputting 1, which is the exclusive-OR of the inverted pseudo-random number bit string in the serial data and the pseudo-random number bit string delayed by the delayer 44 in one block in the frame, for L bits, and outputting 0, which is the pseudo-random number bit string of the pseudo-random number bit string in the serial data and the pseudo-random number bit string delayed by the delayer 44, for the following L−1 bits. As a result, the scrambler 25 outputs low-density toggle data in one of several blocks in the frame.

The scrambler 25 performs an exclusive-OR operation of the container output from the framer 22 and the pseudo-random number bit string delayed by the delayer 44 in blocks other than one of several blocks in the frame. As a result, the scrambler 25 performs scrambling processing on the container output from the framer 22. The output level of the output data of the scrambler 25 is adjusted in accordance with the modulation method by the mapper 26, the gain of the output data is adjusted by the output amplifier 27, and the output data is transmitted to the transmission path 5.

Figure 19D:
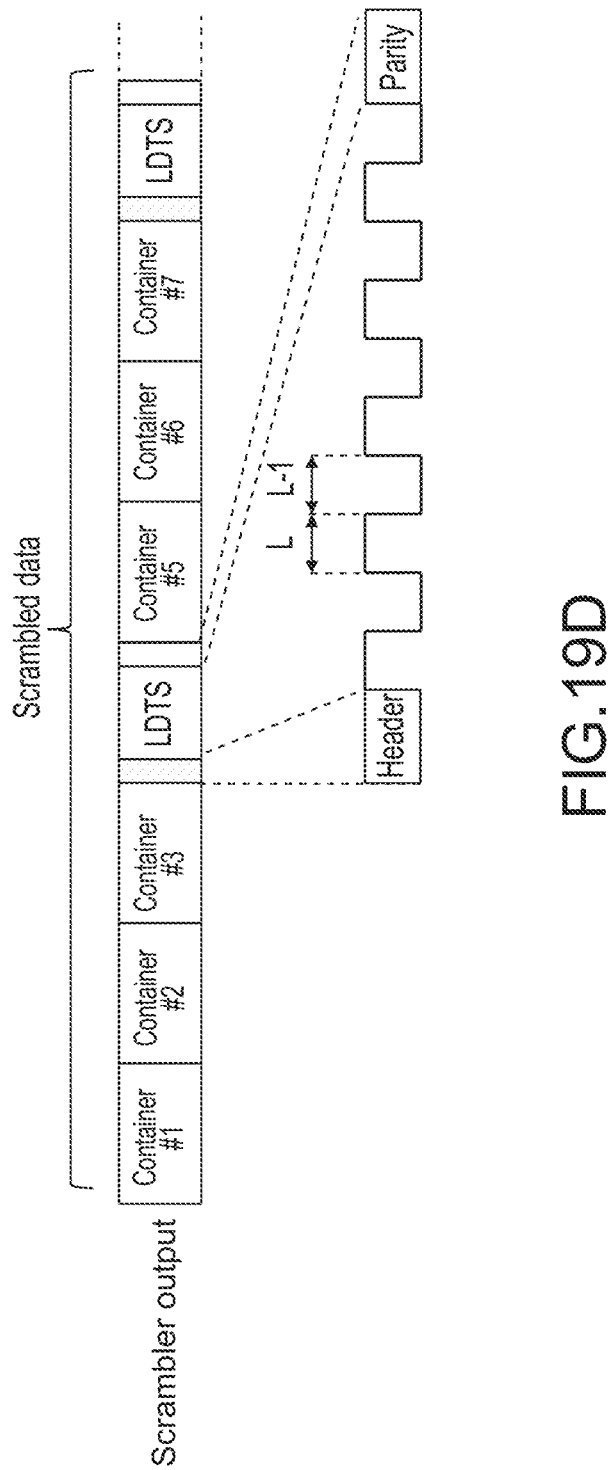
FIG. 19D is a diagram showing an example of scrambled data output from a scrambler.

FIG. 19D is a diagram showing an example of scrambled data output from the scrambler 25. The scrambler 25 outputs low-density toggle data in which "1" continues by L bits that is the number of connected stages of the shift register 31 in the PRBS generator 41, and "0" continues by L−1 bits in one of several blocks in the frame, Since the cycle of the toggle data generated by the scrambler 25 in FIG. 17 is fixed at all times, there is a possibility that EMI-noise occurs. In view of this, instead of the LDTS replacement unit 42 in FIG. 18, the LDTS replacement unit 42 according to a first modified example shown in FIG. 20 may be provided.

Figure 20:
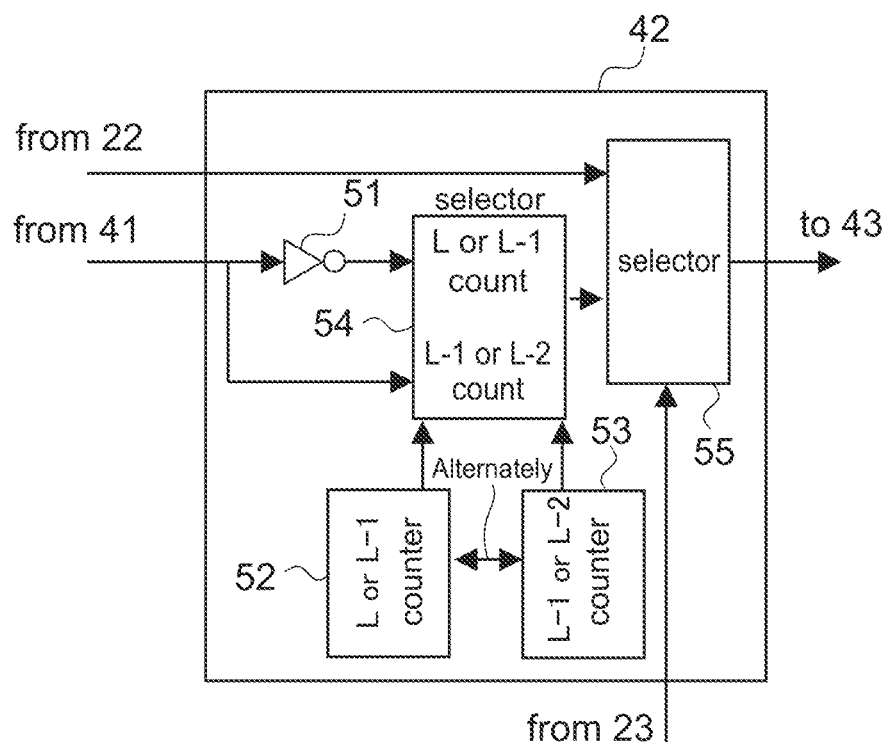
FIG. 20 is a block diagram of a first modified example of an LDTS replacement unit.

The LDTS replacement unit 42 in FIG. 20 includes an inverter 51, a first counter 52, a second counter 53, a first selector 54, and a second selector 55.

The inverter 51 outputs an inverted pseudo-random number bit string obtained by inverting the pseudo-random number bit string generated by the PRBS generator 41 as in the inverter 51 in FIG. 18. The first counter 52 counts L bits or L−1 bits in a predetermined method. The second counter 53 counts L−1 bits or L−2 bits in a predetermined method.

The first selector 54 continues to select the inverted pseudo-random number bit string output from the inverter 51 while the first counter 52 is counting L bits or L−1 bits. Next, the first selector 54 continues to select the pseudo-random number bit string while the second counter 53 is counting L−1 bits or L−2 bits. The first selector 54 alternately selects an inverted pseudo-random number bit string and a pseudo-random number bit string.

Similarly to the second selector 55 in FIG. 18, the second selector 55 selects the output data of the first selector 54 for one of several blocks in the frame, and selects the container output from the frame for the remaining blocks.

Figure 21A:
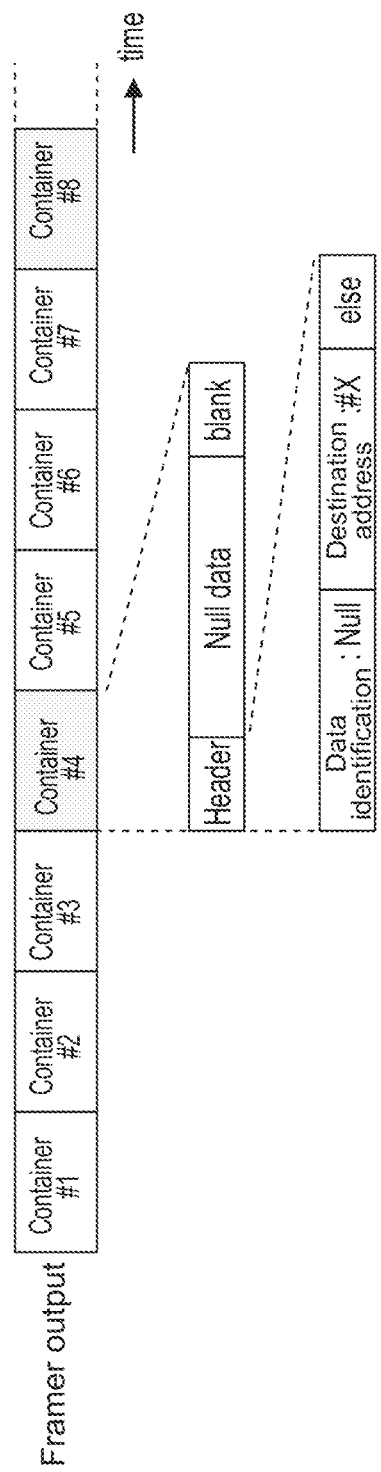
FIG. 21A is a timing diagram of a downlink transmission unit corresponding to an LDTS replacement unit in FIG. 20.
Figure 21B:
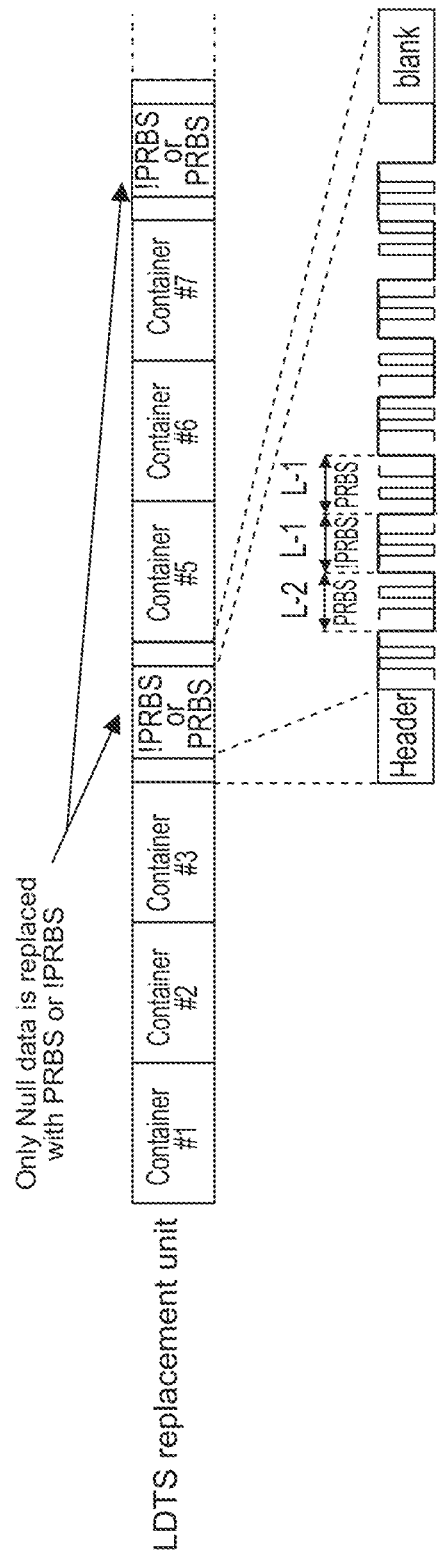
FIG. 21B is a diagram showing output data of an LDTS replacement unit.

FIG. 21A to FIG. 21D are each a timing diagram of the downlink transmission unit 11 corresponding to the LDTS replacement unit 42 in FIG. 20. FIG. 21A shows the output data of the framer 22, which is the same as the output data in FIG. 19A. FIG. 21B shows the output data of the LDTS replacement unit 42, and data different from that in FIG. 19B is output for one of several blocks in the frame. This data is data that alternately includes inverted pseudo-random number data output from the inverter 51 in FIG. 20 continuously for L bits or L−1 bits selected by a predetermined method, and pseudo-random number data output from the PRBS generator 41 continuously for L−1 bits or L−2 bits selected by a predetermined method.

Figure 21C:
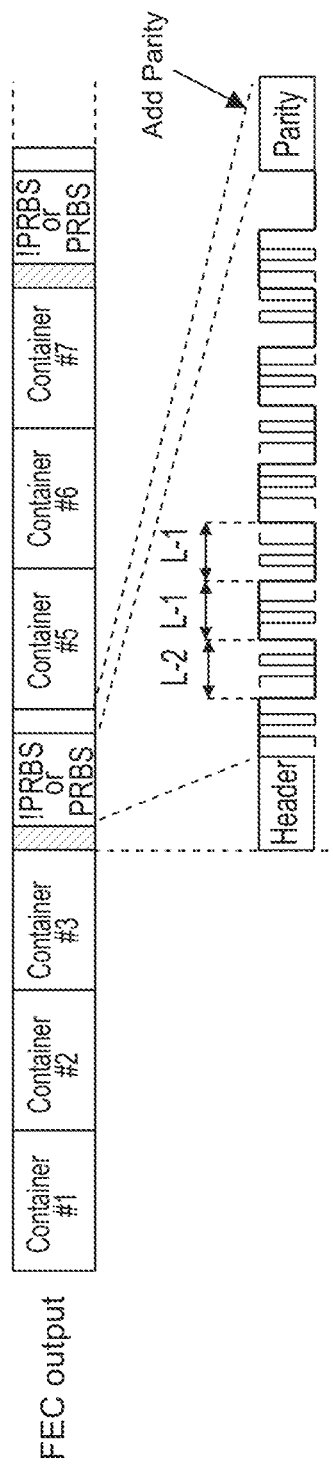
FIG. 21C is a diagram showing output data of an FEC unit.

FIG. 21C shows the output data of the FEC unit 43, and is similarly data alternately including inverted pseudo-random number data output from the inverter 51 in FIG. 20 continuously for L bits or L−1 bits selected by a predetermined method, and pseudo-random number data output from the PRBS generator 41 continuously for L−1 bits or L−2 bits selected by a predetermined method.

Figure 21D:
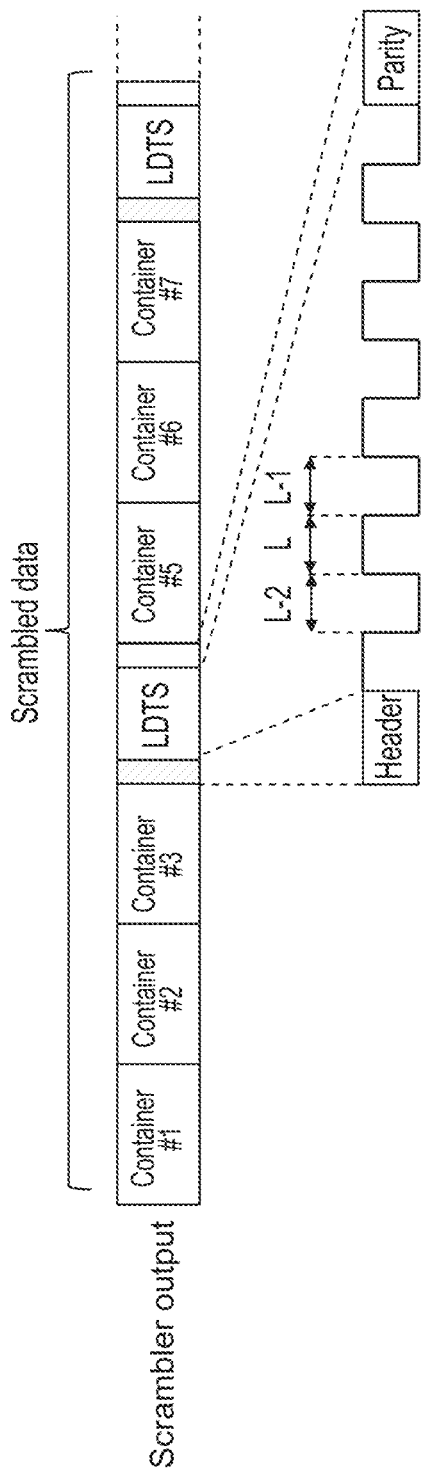
FIG. 21D is a diagram showing output data of a scrambler.

FIG. 21D shows the output data of the scrambler 25, and toggle data different from that in FIG. 19D is output. The toggle data in FIG. 21D is data alternately including "1" that continues for L bits or L−1 bits selected by a predetermined method and "0" that continues for L−1 bits or L−2 bits selected by a predetermined method.

Although an example in which the number of bits in which the signal logical number "1" continues is selected from L bits or L−1 bits by a predetermined method and the number of bits in which the signal logical number "0" continues is selected from L−1 bits or L−2 bits by a predetermined method has been shown in the LDTS replacement unit 42 in FIG. 20, the number of bits of the signal logical numbers "1" and "0" may be arbitrarily set.

Figure 22:
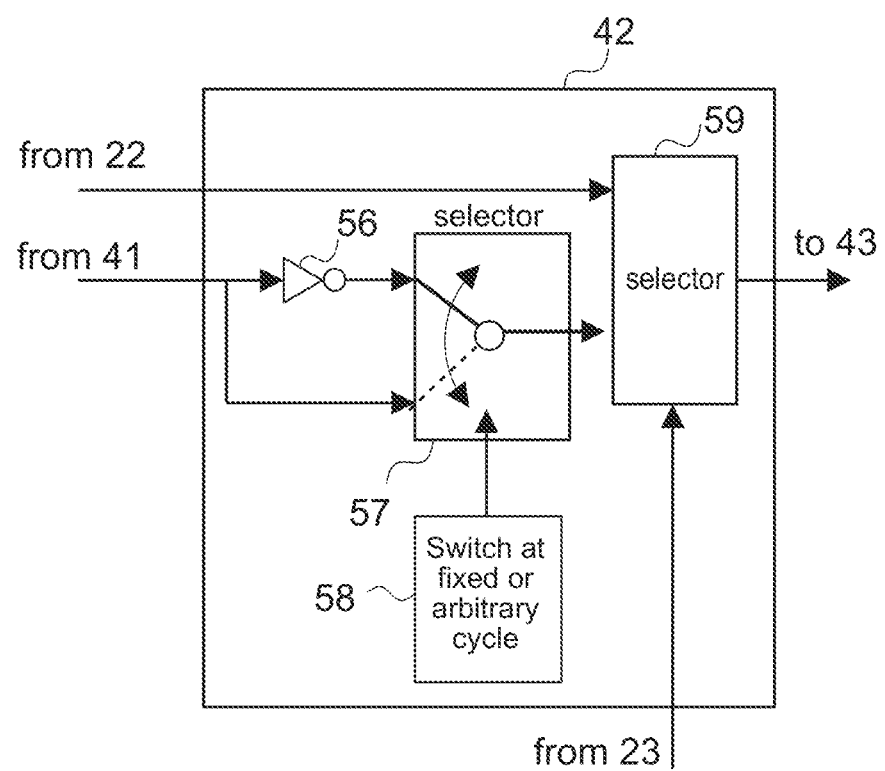
FIG. 22 is a block diagram showing an internal configuration of an LDTS replacement unit according to a second modified example.

FIG. 22 is a block diagram showing an internal configuration of the LDTS replacement unit 42 according to a second modified example. The LDTS replacement unit 42 in FIG. 22 includes an inverter 56, a first selector 57, a selection control unit 58, and a second selector 59.

The inverter 56 generates an inverted pseudo-random number bit string obtained by inverting the pseudo-random number bit string generated by the PRBS generator 41. The first selector 57 selects one of the pseudo random number bit string generated by the PRBS generator 41 and the inverted pseudo random number bit string output from the inverter 56 on the basis of the control signal from the selection control unit 58. The selection control unit 58 outputs a control signal for switching the selection of the first selector 57 at arbitrary timing. For example, the selection control unit 58 may randomly switch between the selections of the first selector 57 on the basis of a pseudo-random number or the like. In the example of FIG. 22, the first selector 57 selects an inverted pseudo-random number bit string. However, the number of bits in which the first selector 57 continuously selects the inverted pseudo-random number bit string is arbitrary and is not limited to the L bits or L−1 bits as shown in FIG. 20. The second selector 59 selects one of the container output from the framer and the output signal of the first selector 57 on the basis of the control signal from the scheduler.

Figure 23:
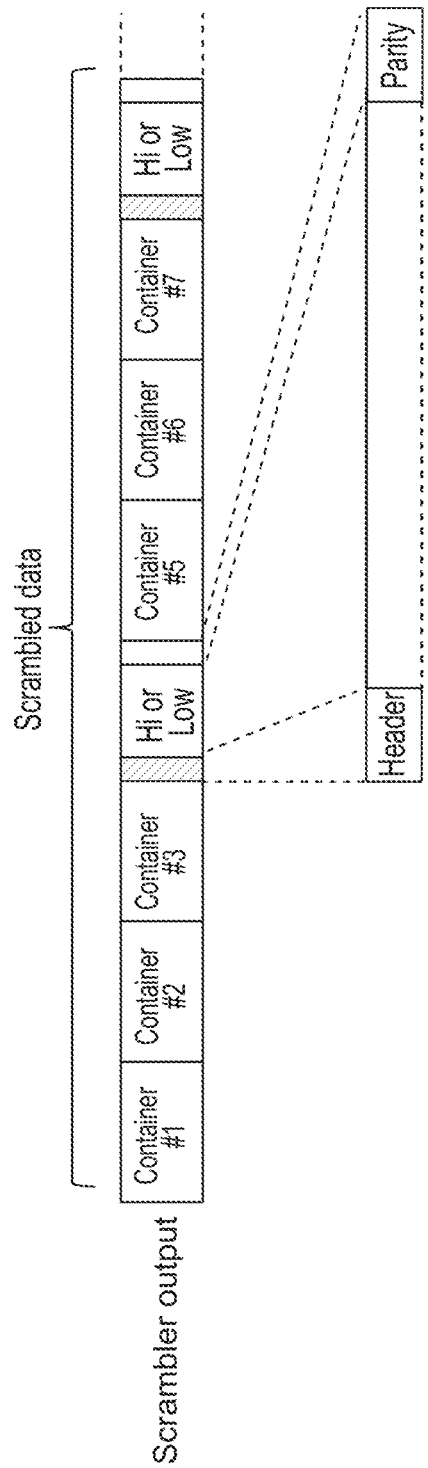
FIG. 23 is a diagram showing an example of scrambled data output from a scrambler in the case of using an LDTS replacement unit in FIG. 22.

FIG. 23 is a diagram showing an example of scrambled data output from the scrambler 25 in the case where the LDTS replacement unit 42 in FIG. 22 is used. The scrambled data includes three containers (Containers #1 to #3) and one container (Container #4) including a header, toggled data of an arbitrary cycle, and a parity. The data of these four containers is repeatedly output.

In the case of using the LDTS replacement unit 42 in FIG. 22, the cycle of the toggle data can be arbitrarily changed in one of several blocks in the frame, so that, for example, the toggle data can be made as long as possible, or the signal logical number can be changed at arbitrary timing in some cases.

As described above, in the downlink transmission unit 11 according to the third improvement example, toggle data is generated by the exclusive-OR of the cereal data obtained by adding an error correction code to the pseudo-random number bit string and the pseudo-random number bit string. In the second improvement example, since it is assumed that the error correction code is not added by the FEC unit 43 to the container to be replaced with the toggle data, the container needs to be processed differently from other containers. In addition, even if there is an error in information of the header of the container to be replaced with toggle data, it is difficult to correct the error. Meanwhile, in the third improvement example, since the container to be replaced with the toggle data and the other containers can be treated in the same manner and converted into serial data after adding the error correction code by the FEC unit 43, it is unnecessary to distinguish the processing of the container to be replaced with the toggle data from the processing of the other containers in the downlink transmission unit 11, and the processing operation can be simplified. In addition, since the container to be replaced with toggle data is also converted into serial data after adding the error correction code by the FEC unit 43, even if there is an error in the header portion, the error can be corrected, and there is no possibility that the toggle data is incorrectly recognized as other data on the receiving side.

It should be noted that the present technology may take the following configurations.

(1) A transmission apparatus that transmits information generated by an information source and divided for each block to a transmission path in units of frames including a plurality of the blocks, including:
a transmission unit that stops the transmission of information to the transmission path or transmits toggle data to the transmission path in one of several blocks in the frame where an amount of information to be transmitted is less than a transmission capacity of the transmission path, the toggle data having a cycle of transition of information longer than that of information in a block other than the one block in the frame.

(2) The transmission apparatus according to (1), in which
the transmission unit transmits data of a specific signal logical value to the transmission path or sets the transmission path to a high impedance during a period in which the transmission of information to the transmission path is stopped.
(3) The transmission apparatus according to (1) or (2), in which
the transmission unit sets a destination address of the one block in which the transmission of information to the transmission path is stopped to an address that is different from an address of a reception apparatus that receives information via the transmission path.
(4) The transmission apparatus according to any one of (1) to (3), in which
the transmission unit includes a scrambler that generates scrambled data obtained by scrambling information generated by the information source, regardless of whether or not the transmission of information to the transmission path is stopped.
(5) The transmission apparatus according to any one of (1) to (4), in which
the transmission unit transmits a predetermined resynchronization pattern to the transmission path after a period in which the transmission of information to the transmission path is stopped has elapsed and before the transmission of information to the transmission path is resumed, and
the resynchronization pattern is used for performing synchronous reproduction processing of information received by a reception apparatus via the transmission path.
(6) The transmission apparatus according to (4), in which
the transmission unit includes a selection unit that selects one of the scrambled data and a predetermined resynchronization pattern used for performing synchronous reproduction processing of information received by a reception apparatus via the transmission path and transmits the selected one to the transmission path.
(7) The transmission apparatus according to (6), in which
the transmission unit includes a scheduler that controls the selection by the selection unit on a basis of a control signal transmitted by the reception apparatus via the transmission path.
(8) The transmission apparatus according to (1), in which
the transmission unit includes a scrambler that generates scrambled data obtained by scrambling information generated by the information source,
the scrambler includes
a shift register including a plurality of registers that sequentially shifts serial data corresponding to information generated by the information source, and
a logical arithmetic unit that generates the scrambled data by a predetermined logical operation between the data shifted by the shift register and the serial data to be input to the shift register, and
the transmission unit causes information to be transmitted to the transmission path to transit at a cycle corresponding to the number of stages of the plurality of registers in the shift register in one of several blocks in the frame.
(9) The transmission apparatus according to (8), in which
the transmission unit transmits, to the transmission path, information including consecutive is having the number of bits corresponding to the number of the plurality of registers in the shift register and consecutive 0s having the number of bits corresponding to the number obtained by subtracting 1 from the number of the plurality of registers in the shift register in one of several blocks in the frame.
(10) The transmission apparatus according to (8), in which
the transmission unit transmits, to the transmission path, information including consecutive is having the number of bits corresponding to the number selected, by a predetermined method, from the number of the plurality of registers in the shift register and the number obtained by subtracting 1 from the number of the plurality of registers, and consecutive 0s having the number of bits corresponding to the number selected, by a predetermined method, from the number obtained by subtracting 1 from the number of the plurality of registers in the shift register and the number obtained by subtracting 2 from the number of the plurality of registers in one of several blocks in the frame.
(11) The transmission apparatus according to any one of (8) to (10, in which
the transmission unit transmits, to the transmission path, header information whose destination address is an address different from an address of a reception apparatus connected to the transmission path before transmitting information to the transmission path in one of several blocks in the frame.
(12) The transmission apparatus according to (11), in which
the header information includes identification information of the toggle data.
(13) The transmission apparatus according to (1), in which
the transmission unit includes
a pseudo-random number device that generates a pseudo-random number signal, and
a scrambler that generates the toggle data on a basis of the pseudo-random number signal in one of several blocks in the frame.
(14) The transmission apparatus according to (13), further including:
a replacement unit that selects information generated by the information source in a block other than the one block in the frame and selects the pseudo-random number signal in the one block;
an error correction processor that adds an error correction code to information selected by the replacement unit; and
a delayer that delays the pseudo-random number signal by a predetermined period, in which
the scrambler generates the toggle data on a basis of an output signal of the error correction processor and an output signal of the delayer in one of several blocks in the frame.
(15) The transmission apparatus according to (14), in which
the predetermined period is a period from when the pseudo-random number device generates the pseudo-random number signal to when an output signal of the error correction processor is input to the scrambler, and
the scrambler generates the toggle data by one of an exclusive-OR of an output signal of the error correction processor and an output signal of the delayer and an exclusive-OR of the output signal of the error correction processor and an inverted signal of the output signal of the delayer in one of several blocks in the frame.
(16) The transmission apparatus according to (15), in which
the pseudo-random number device includes a shift register including a plurality of registers, and
the scrambler generates the toggle data including consecutive first signal logical numbers having the number of bits corresponding to the number of the plurality of registers in the shift register, and second signal logical numbers having the number of bits corresponding to the number obtained by subtracting 1 from the number of the plurality of registers in the shift register in one of several blocks in the frame.
(17) The transmission apparatus according to (15), in which
the pseudo-random number device includes a shift register including a plurality of registers, and
the scrambler generates the toggle data including consecutive first signal logical numbers having the number of bits corresponding to the number selected, by a predetermined method, from the number of the plurality of registers in the shift register and the number obtained by subtracting 1 from the number of the plurality of registers, and consecutive second signal logical numbers having the number of bits corresponding to the number selected, by a predetermined method, from the number obtained by subtracting 1 from the number of the plurality of registers in the shift register and the number obtained by subtracting 2 from the number of the plurality of registers in one of several blocks in the frame.
(18) The transmission apparatus according to (15), in which
the scrambler maximizes a cycle in one of several blocks in the frame or generates the toggle data having a cycle that can be arbitrarily selected.
(19) The transmission apparatus according to any one of (1) to (18), in which
the transmission unit transmits information to the transmission path within a period allocated by a TDD (Time Division Duplex) method.
(20) A communications system, including:
a master apparatus; and
a slave apparatus that transmits information generated by an information source and divided for each block to the master apparatus via a transmission path in units of frames including a plurality of the blocks in accordance with an instruction from the master apparatus,
the slave apparatus including a transmission unit that stops the transmission of information to the transmission path or transmits toggle data to the transmission path in one of several blocks in the frame, where an amount of information generated by the information source is less than a transmission capacity of the transmission path, the toggle data having a cycle of transition of information longer than that of information in a block other than the one block in the frame.
(21) An information transmission method of transmitting information generated by an information source and divided for each block to a transmission path in units of frames including a plurality of the blocks, including:
stopping the transmission of information to the transmission path or transmitting toggle data to the transmission path in one of several blocks in the frame, where an amount of information generated by the information source is less than a transmission capacity of the transmission path, the toggle data having a cycle of transition of information longer than that of information in a block other than the one block in the frame.

Embodiments of the present disclosure are not limited to the individual embodiments described above, and also include various modifications that may be conceived by those skilled in the art, and the effects of the present disclosure are not limited to the content described above. In other words, various additions, modifications, and partial deletions may be made without departing from the conceptual idea and essence of the present disclosure which can be derived from the content defined in the claims and the equivalents thereof.

What is claimed is:
1. A transmission apparatus, comprising:
transmission circuitry configured to map input signals to output levels in accordance with a Pulse Amplitude Modulation with Four Levels (PAM-4) modulation technique, the input signals including a first signal set and a second signal set, the output levels including a first output level and a second output level,
wherein the transmission circuitry is configured to map the first signal set to the first output level and to map the second signal set to the second output level,
the first output level and the second output level constitute peak-to-peak values of the output levels,
the transmission circuitry is configured for transmitting data generated by an information source to a transmission path in units of frames including a plurality of blocks,
the transmission circuitry is configured to stop the transmission of data to the transmission path or to transmit toggle data to the transmission path in a first block of the plurality of blocks in a corresponding one of the frames where an amount of data to be transmitted is less than a transmission capacity of the transmission path, the toggle data having a cycle of transition of data that is longer than that of data in a second block of the plurality of blocks.
2. The transmission apparatus according to claim 1, wherein the first output level is a first value and the second output level is a second value, the first value being a low peak value among the peak-to-peak values and the second value being a high peak value among the peak-to-peak values.
3. The transmission apparatus according to claim 1, wherein the first signal set comprises a first set of two consecutive bits, and the second signal set comprises a second set of two consecutive bits different from the first set of two consecutive bits.
4. The transmission apparatus according to claim 1, wherein the transmission circuitry is configured to bidirectionally transmit data with another transmission apparatus through a transmission path within periods allocated by time division duplexing.
5. The transmission apparatus according to claim 1, wherein
the transmission circuitry includes a pseudo-random number device that generates a pseudo-random number signal, and a scrambler that generates the toggle data on a basis of the pseudo-random number signal.

6. A communications system, comprising:
a first transmission apparatus; and
a second transmission apparatus, the second transmission apparatus including:
transmission circuitry configured to map input signals to output levels in accordance with a Pulse Amplitude Modulation with Four Levels (PAM-4) modulation technique, the input signals including a first signal set and a second signal set, the output levels including a first output level and a second output level,
wherein the transmission circuitry is configured to map the first signal set to the first output level and to map the second signal set to the second output level, the first output level and the second output level constitute peak-to-peak values of the output levels,
the transmission circuitry is configured for transmitting data generated by an information source to a transmission path in units of frames including a plurality of blocks,
the transmission circuitry is configured to stop the transmission of data to the transmission path or to transmit toggle data to the transmission path in a first block of the plurality of blocks in a corresponding one of the frames where an amount of data to be transmitted is less than a transmission capacity of the transmission path, the toggle data having a cycle of transition of data that is longer than that of data in a second block of the plurality of blocks.

7. The communications system according to claim 6, wherein the first output level is a first value and the second output level is a second value, the first value being a low peak value among the peak-to-peak values and the second value being a high peak value among the peak-to-peak values.

8. The communications system according to claim 6, wherein the first signal set comprises a first set of two consecutive bits, and the second signal set comprises a second set of two consecutive bits different from the first set of two consecutive bits.

9. The communications system according to claim 6, wherein the transmission circuitry is configured to bidirectionally transmit data with the first transmission apparatus through a transmission path within periods allocated by time division duplexing.

10. The communications system according to claim 6, wherein
the transmission circuitry includes a pseudo-random number device that generates a pseudo-random number signal, and a scrambler that generates the toggle data on a basis of the pseudo-random number signal.

* * * * *